(12) United States Patent
Shreevastav et al.

(10) Patent No.: US 12,461,185 B2
(45) Date of Patent: Nov. 4, 2025

(54) ASSISTANCE DATA FOR RAT-DEPENDENT POSITIONING

(71) Applicant: Telefonaktiebolaget LM Ericsson (publ), Stockholm (SE)

(72) Inventors: Ritesh Shreevastav, Upplands Väsby (SE); Åke Busin, Sollentuna (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 889 days.

(21) Appl. No.: 17/608,177

(22) PCT Filed: Apr. 30, 2020

(86) PCT No.: PCT/SE2020/050440
§ 371 (c)(1),
(2) Date: Nov. 2, 2021

(87) PCT Pub. No.: WO2020/222697
PCT Pub. Date: Nov. 5, 2020

(65) Prior Publication Data
US 2022/0221548 A1     Jul. 14, 2022

Related U.S. Application Data

(60) Provisional application No. 62/842,477, filed on May 2, 2019, provisional application No. 62/842,520, filed on May 2, 2019.

(51) Int. Cl.
*G01S 5/00*     (2006.01)
*G01S 5/02*     (2010.01)
(Continued)

(52) U.S. Cl.
CPC .......... *G01S 5/0045* (2013.01); *G01S 5/0236* (2013.01); *H04W 4/025* (2013.01); *H04W 8/186* (2013.01);
(Continued)

(58) Field of Classification Search
CPC .... G01S 5/0045; G01S 5/0236; H04W 4/025; H04W 8/186; H04W 8/24; H04W 24/02;
(Continued)

(56) References Cited

U.S. PATENT DOCUMENTS

2010/0309057 A1    12/2010   Edge et al.
2012/0258733 A1*   10/2012   Fischer .................... G01S 5/04
                                                             455/456.1
(Continued)

FOREIGN PATENT DOCUMENTS

CO    2021013759 A2    1/2022
WO    2018132226 A1    7/2018
(Continued)

OTHER PUBLICATIONS

Qualcomm Incorporated, et al., "System Level Aspects of UE-Based Positioning", 3GPP TSG-RAN WG2 Meeting #105bis, R2-1905385, Xi'an, China, Apr. 8-12, 2019, 1-7.
(Continued)

*Primary Examiner* — Obaidul Huq
(74) *Attorney, Agent, or Firm* — Murphy, Bilak & Homiller, PLLC

(57) ABSTRACT

A wireless device (12) is configured for radio access technology, RAT, dependent positioning in a wireless communication network (10). The wireless device (12) receives, from a network node (18), assistance data (20) that assists the wireless device (12) with RAT-dependent positioning, e.g., downlink Observed Time Difference of Arrival. The assistance data (20) may be based on device-specific infor-
(Continued)

mation. The device-specific information may for example include a subscription associated with the wireless device (12). The wireless device (12) may perform the RAT-dependent positioning based on assistance from the assistance data (20).

26 Claims, 30 Drawing Sheets

(51) Int. Cl.
  *H04W 4/02* (2018.01)
  *H04W 8/18* (2009.01)
  *H04W 8/24* (2009.01)
  *H04W 24/02* (2009.01)
  *H04W 48/14* (2009.01)
  *H04W 64/00* (2009.01)

(52) U.S. Cl.
  CPC ............ *H04W 8/24* (2013.01); *H04W 24/02* (2013.01); *H04W 48/14* (2013.01); *H04W 64/003* (2013.01)

(58) Field of Classification Search
  CPC ... H04W 48/14; H04W 64/003; H04W 64/00; H04W 8/18; H04W 76/28
  USPC .................................................. 370/310, 328
  See application file for complete search history.

(56) References Cited

U.S. PATENT DOCUMENTS

| | | | | |
|---|---|---|---|---|
| 2017/0311217 | A1* | 10/2017 | Jung | H04W 48/08 |
| 2018/0192443 | A1* | 7/2018 | Novlan | H04W 76/15 |
| 2018/0324740 | A1 | 11/2018 | Edge et al. | |
| 2018/0343635 | A1 | 11/2018 | Edge et al. | |
| 2020/0383080 | A1* | 12/2020 | Sharma | H04W 76/10 |
| 2022/0150865 | A1* | 5/2022 | Cha | G01S 5/011 |
| 2022/0221548 | A1 | 7/2022 | Shreevastav et al. | |

FOREIGN PATENT DOCUMENTS

| | | |
|---|---|---|
| WO | 2018132297 A1 | 7/2018 |
| WO | 2018203820 A1 | 11/2018 |
| WO | 2019009578 A1 | 1/2019 |
| WO | 2019074435 A1 | 4/2019 |
| WO | 2022148656 A1 | 7/2022 |

OTHER PUBLICATIONS

ITRI, "Discussion on Potential Techniques for NR Positioning", 3GPP TSG RAN WG1 #96bis, R1-1905082, Xi'An, China, Apr. 8-Apr. 12, 2019, 1-6.

3GPP, "3GPP TS 36.305 V15.2.0", 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15), Dec. 2018, 1-88.

3GPP, "3GPP TS 36.355 V15.2.0", 3rd Generation Partnership Project; Technical Specification Group Radio Access Network; Evolved Universal Terrestrial Radio Access (E-UTRA); LTE Positioning Protocol (LPP) (Release 15), Dec. 2018, 1-220.

3GPP, "3rd Generation Partnership Project; Technical Specification Group Radio Access Network; Evolved Universal Terrestrial Radio Access (E-UTRA); LTE Positioning Protocol (LPP) (Release 14)", 3GPP TS 36.355 V14.6.0, Jun. 2018, 1-171.

Ericsson, "UE Based Positioning Method", 3GPP TSG-RAN WG2 #106, R2-19xxxxx, Reno, USA, May 13-17, 2019, 1-3.

Intel Corporation, et al., "New WID: NR Positioning Support", 3GPP TSG RAN Meeting #83, RP-190752, (revision of RP-190723), Shenzhen, China, Mar. 18-21, 2019, 1-6.

Qualcomm Incorporated, "Modification of Positioning SIBs", 3GPP TSG-RAN WG2 Meeting #103, R2-1812356, Gothenburg, Sweden, Aug. 20-24, 2018, 1-5.

* cited by examiner

ASSISTANCE DATA FOR RAT-DEPENDENT POSITIONING

RELATED APPLICATIONS

The present application claims the benefit of U.S. Provisional Patent Application No. 62/842,477, filed May 2, 2019, and U.S. Provisional Patent Application No. 62/842,520, filed May 2, 2019, both of which are incorporated by reference herein in their entirety.

TECHNICAL FIELD

The present application relates generally to a wireless communication network, and relates more specifically to radio access technology (RAT) dependent positioning in such a network.

BACKGROUND

Positioning has been a topic in Long Term Evolution (LTE) standardization since 3GPP Release 9. The primary objective is to fulfill regulatory requirements for emergency call positioning. Positioning in New Radio (NR) is proposed to be supported by the architecture shown in FIG. 1, which shows the NG-RAN Rel-15 Location Services (LCS) Protocols. The Location Management Function (LMF) is the location node in NR. There are also interactions between the location node and the gNodeB via the NRPPa protocol. The interactions between the gNodeB and the device is supported via the Radio Resource Control (RRC) protocol. The gNB and ng-eNB may not always both be present. When both the gNB and ng-eNB are present, the NG-C interface is only present for one of them.

In the legacy LTE standards, the following techniques are supported. In Enhanced Cell ID, cell ID information associates the device to the serving area of a serving cell, and then additional information may be used to determine a finer granularity position. In Assisted Global Navigation Satellite System (GNSS), GNSS information is retrieved by the device, supported by assistance information provided to the device from the Evolved Serving Mobile Location Center (E-SMLC). In OTDOA (Observed Time Difference of Arrival), the device estimates the time difference of reference signals from different base stations and sends to the E-SMLC for multilateration. In UTDOA (Uplink Time Difference Of Arrival, TDOA), the device is requested to transmit a specific waveform that is detected by multiple location measurement units (e.g. an eNB) at known positions. These measurements are forwarded to E-SMLC for multilateration. Sensor methods such as Biometric pressure sensor provide a vertical position of the device and an Inertial Motion Unit (IMU) provides displacement.

The positioning modes can be categorized in the below three areas. In UE-Assisted mode, the UE performs measurements with or without assistance from the network and sends these measurements to the E-SMLC where the position calculation may take place. In UE-Based mode, the UE performs measurements and calculates its own position with assistance from the network. In standalone mode, the UE performs measurements and calculates its own position without network assistance.

Challenges exist in specifying system level aspects of downlink (DL)-only user equipment (UE) based positioning. RAT-dependent procedures such as DL OTDOA have heretofore not been supported as UE-based. It has only been supported for the UE-assisted case. Moreover, there has heretofore been a provision in the Long Term Evolution (LTE) Positioning Protocol (LPP) (3GPP TS 36.355) to provide periodical reports. However, this requires the UE to be in Radio Resource Control (RRC) connected mode.

SUMMARY

Certain aspects of the present disclosure and their embodiments may provide solutions to these or other challenges. Some embodiments herein include methods to support DL RAT-dependent UE-based positioning methods.

More particularly, embodiments herein include a method performed by a wireless device for radio access technology, RAT, dependent positioning in a wireless communication network. The method in some embodiments includes receiving, from a network node, assistance data that assists the wireless device with RAT-dependent positioning, e.g., downlink OTDOA. In some embodiments, the assistance data is based on device-specific information. The device-specific information may for example include a subscription associated with the wireless device.

In some embodiments, the assistance data includes cell-specific information for one or more cells. For example, in some embodiments, for each of the one or more cells, the cell-specific information includes one or more of: an identity of the cell; a location of the cell; a real-time difference between the cell and each of one or more others of the one or more cells; or a drift rate between the cell and each of one or more others of the one or more cells. Regardless, in some embodiments, for which one or more cells, clusters of cells, or zones of clusters the assistance data includes cell-specific information is based on the device-specific information; that is, which cell(s), cluster(s), or zone(s) the assistance data relates to is based on the device-specific information. In one or more embodiments, for instance, the device-specific information also includes location or path information of the wireless device, and the one or more cells, clusters of cells, or zones of clusters for which the assistance data includes cell-specific information comprise one or more cells, clusters of cells, or zones of clusters in or near a path that the wireless device is or is expected to move according to the location or path information of the wireless device.

Alternatively or additionally, in some embodiments, for how many cells, clusters of cells, or zones of clusters the assistance data includes cell-specific information is based on the device-specific information. In one embodiment, a number of cells for which the assistance data includes cell-specific information increases with increases in a level of the subscription associated with the wireless device. In another embodiment, a number of cells for which the assistance data includes cell-specific information increases with increases in at least one of any one or more of: a positioning quality of service required by one or more positioning requirements of the wireless device; and a memory capability and/or processing capability of the wireless device.

Alternatively or additionally, which one or more types of cell-specific information the assistance data includes is based on the device-specific information. In one embodiment, whether the cell-specific information includes real-time difference information for each of the one or more cells depends on a level of the subscription associated with the wireless device. For example, whether the cell-specific information includes real-time difference information for each of the one or more cells also depends on a positioning quality of service required by one or more positioning requirements of the wireless device, where the device-specific information also includes the one or more positioning requirements of the wireless device.

In some embodiments, the device-specific information also includes at least one of any one or more of: one or more capabilities of the wireless device; one or more positioning requirements of the wireless device; one or more reasons that the wireless device needs the assistance data; and location or path information of the wireless device. In one such embodiment, the method further comprises transmitting, from the wireless device to the network node, control signaling that indicates at least one of any one or more of: the one or more capabilities of the wireless device; the one or more positioning requirements of the wireless device; the one or more reasons that the wireless device needs the assistance data; or the location or path information of the wireless device.

In some embodiments, the method further comprises receiving validity information from the network node indicating for how long the assistance data will be valid, and requesting updated assistance data responsive to the assistance data becoming invalid.

In some embodiments, the network node is a location server or is configured to perform mobility management.

In some embodiments, the RAT-dependent positioning comprises downlink observed time difference of arrival.

In some embodiments, the method further comprises receiving, from the wireless communication network, configuration signaling that configures the wireless device to, while the wireless device is in an idle mode or an inactive mode, obtain device-based positioning information using the assistance data and either: store the device-based positioning information at the wireless device at least until the wireless device reports the device-based positioning information in a connected mode; or report the device-based positioning information in a connected mode when a reporting condition is met. In one such embodiment, the configuration signaling indicates one or more events whose occurrence is to trigger the wireless device to obtain and/or store the device-based positioning information while the wireless device is in an idle mode or an inactive mode, where the one or more events include: the wireless device switching from being served by a cell belonging to one cluster of cells to being served by a cell belonging to a different cluster of cells; or fluctuation of a parameter by at least a defined fluctuation threshold.

The method in some embodiments may alternatively or additionally include transmitting, from the wireless device to the network node, control signaling that indicates at least some of the device-specific information. The control signaling may for instance be included in a mobile originated location request message.

The method may alternatively or additionally include, transmitting from the wireless device to the network node, a request for the assistance data.

The method in any event may finally include performing the RAT-dependent positioning based on assistance from the assistance data.

Embodiments herein further include a method performed by a network node for assisting with radio access technology, RAT, dependent positioning. The method comprises transmitting, to a wireless device, assistance data that assists the wireless device with RAT-dependent positioning, where the assistance data is based on device-specific information that includes a subscription associated with the wireless device.

In some embodiments, the assistance data includes cell-specific information for one or more cells. For example, in some embodiments, for each of the one or more cells, the cell-specific information includes one or more of: an identity of the cell; a location of the cell; a real-time difference between the cell and each of one or more others of the one or more cells; or a drift rate between the cell and each of one or more others of the one or more cells. Regardless, in some embodiments, for which one or more cells, clusters of cells, or zones of clusters the assistance data includes cell-specific information is based on the device-specific information; that is, which cell(s), cluster(s), or zone(s) the assistance data relates to is based on the device-specific information. In one or more embodiments, for instance, the device-specific information also includes location or path information of the wireless device, and the one or more cells, clusters of cells, or zones of clusters for which the assistance data includes cell-specific information comprise one or more cells, clusters of cells, or zones of clusters in or near a path that the wireless device is or is expected to move according to the location or path information of the wireless device.

Alternatively or additionally, in some embodiments, for how many cells, clusters of cells, or zones of clusters the assistance data includes cell-specific information is based on the device-specific information. In one embodiment, a number of cells for which the assistance data includes cell-specific information increases with increases in a level of the subscription associated with the wireless device. In another embodiment, a number of cells for which the assistance data includes cell-specific information increases with increases in at least one of any one or more of: a positioning quality of service required by one or more positioning requirements of the wireless device; and a memory capability and/or processing capability of the wireless device.

Alternatively or additionally, which one or more types of cell-specific information the assistance data includes is based on the device-specific information. In one embodiment, whether the cell-specific information includes real-time difference information for each of the one or more cells depends on a level of the subscription associated with the wireless device. For example, whether the cell-specific information includes real-time difference information for each of the one or more cells also depends on a positioning quality of service required by one or more positioning requirements of the wireless device, where the device-specific information also includes the one or more positioning requirements of the wireless device.

In some embodiments, the device-specific information also includes at least one of any one or more of: one or more capabilities of the wireless device; one or more positioning requirements of the wireless device; one or more reasons that the wireless device needs the assistance data; and location or path information of the wireless device. In one such embodiment, the method further comprises transmitting, from the wireless device to the network node, control signaling that indicates at least one of any one or more of: the one or more capabilities of the wireless device; the one or more positioning requirements of the wireless device; the one or more reasons that the wireless device needs the assistance data; or the location or path information of the wireless device.

In some embodiments, the method further comprises determining the assistance data based on the device-specific information. For example, in one embodiment, such determining comprises determining, based on the device-specific information, at least one of any one or more of: for which one or more cells, one or more clusters of cells, and/or one or more zones of cell clusters the assistance data is to include cell-specific information; for how many cells, clusters of cells, and/or zones of cell clusters the assistance data is to include cell-specific information; and which one or more types of cell-specific information the assistance data is to include for each of one or more cells, one or more clusters of cells, or one or more zones of cell clusters.

In some embodiments, the device-specific information also includes at least one of any one or more of: one or more capabilities of the wireless device; one or more positioning requirements of the wireless device; one or more reasons that the wireless device needs the assistance data; and location or path information of the wireless device.

In some embodiments, the method further comprises receiving, from the wireless device, control signaling that indicates at least one of any one or more of: the one or more capabilities of the wireless device; the one or more positioning requirements of the wireless device; the one or more reasons that the wireless device needs the assistance data; and the location or path information of the wireless device.

In some embodiments, the method further comprises transmitting validity information to the wireless device indicating for how long the assistance data will be valid.

In some embodiments, the network node is a location server or is configured to perform mobility management.

In some embodiments, the RAT-dependent positioning comprises downlink observed time difference of arrival.

In some embodiments, the method further comprises transmitting, to the wireless device, configuration signaling that configures the wireless device to, while the wireless device is in an idle mode or an inactive mode, obtain device-based positioning information using the assistance data and either: store the device-based positioning information at the wireless device at least until the wireless device reports the device-based positioning information in a connected mode; or report the device-based positioning information in a connected mode when a reporting condition is met. In one such embodiment, the configuration signaling indicates one or more events whose occurrence is to trigger the wireless device to obtain and/or store the device-based positioning information while the wireless device is in an idle mode or an inactive mode, where the one or more events include: the wireless device switching from being served by a cell belonging to one cluster of cells to being served by a cell belonging to a different cluster of cells; or fluctuation of a parameter by at least a defined fluctuation threshold.

Embodiments herein also include corresponding apparatus, computer programs, and carriers of those computer programs. For example, embodiments herein include a wireless device, e.g., comprising communication circuitry and processing circuitry. The wireless device is configured for radio access technology, RAT, dependent positioning in a wireless communication network. The wireless device in some embodiments is configured to receive, from a network node, assistance data that assists the wireless device with RAT-dependent positioning, e.g., downlink OTDOA. In some embodiments, the assistance data is based on device-specific information. The device-specific information may for example include a subscription associated with the wireless device.

Embodiments herein further include a network node, e.g., comprising communication circuitry and processing circuitry. The network node is configured for assisting with radio access technology, RAT, dependent positioning. The network node is configured to transmit, to a wireless device, assistance data that assists the wireless device with RAT-dependent positioning, where the assistance data is based on device-specific information that includes a subscription associated with the wireless device.

Alternatively or additionally, some embodiments provide methods for supporting RRC Inactive and/or Idle mode measurement configuration and reporting for positioning. The network in such embodiments advantageously may have the possibility to obtain positioning results performed by the wireless device in RRC idle state or RRC Inactive state.

DETAILED DESCRIPTION

Figure 1:
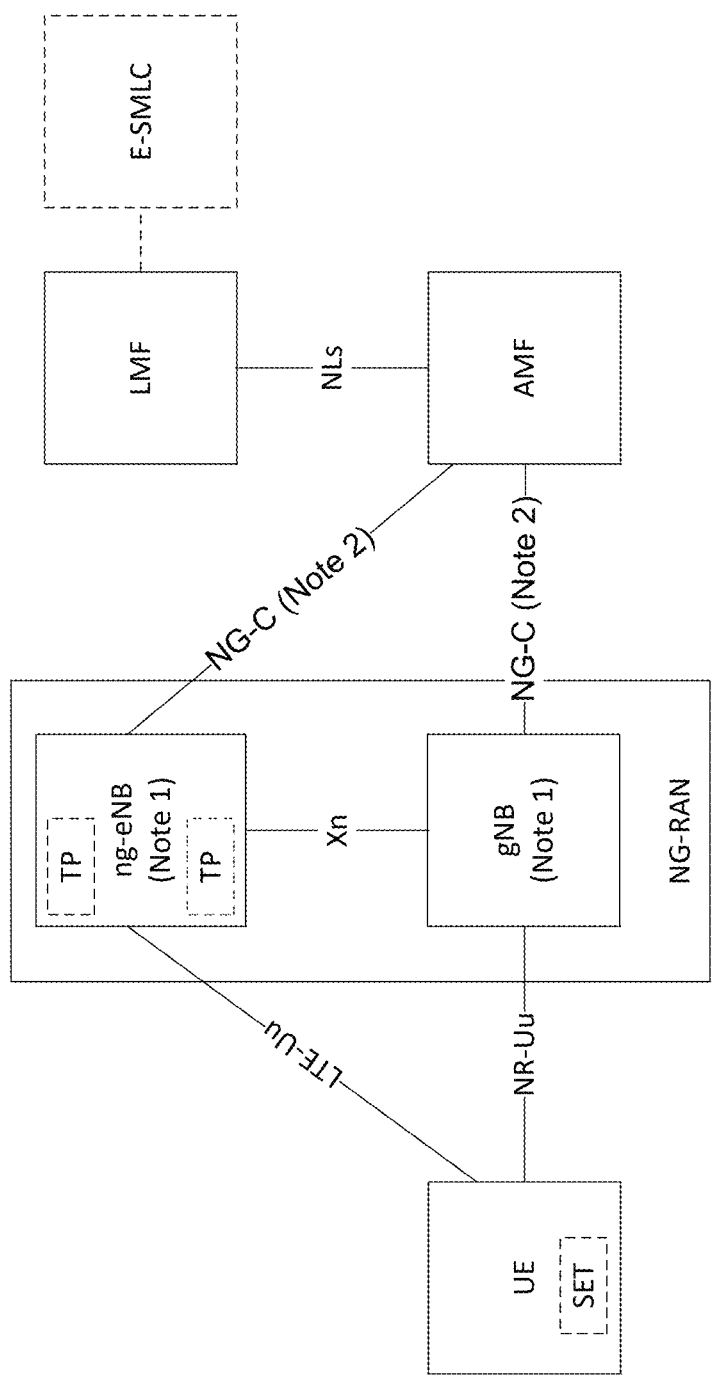
FIG. 1 is a block diagram of an architecture which supports positioning in New Radio (NR) according to some embodiments.
Figure 2:
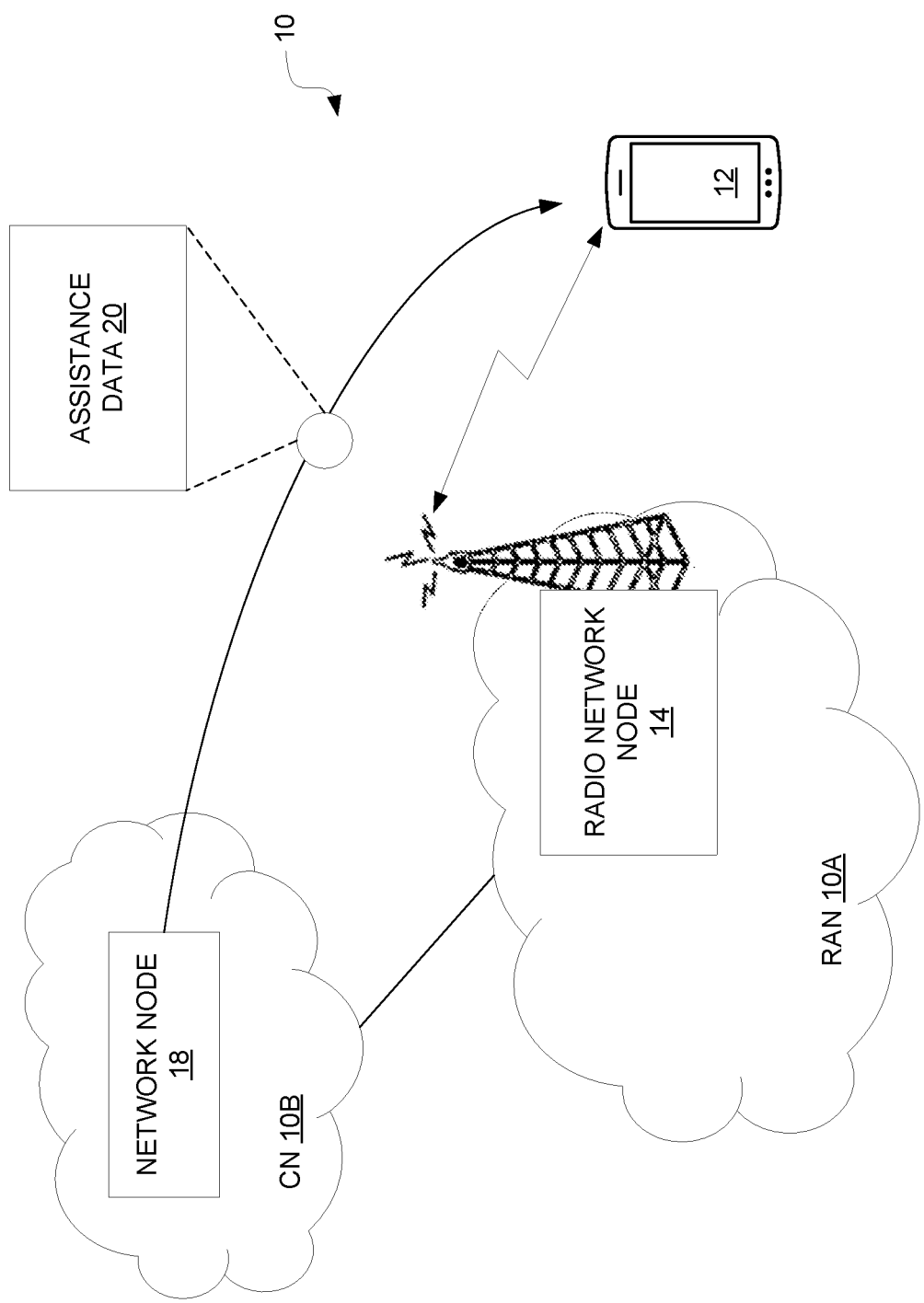
FIG. 2 is a block diagram of a wireless communication network according to some embodiments.

FIG. 2 shows a wireless communication network 10 according to some embodiments. The network 10 in some embodiments is a 5G network. The network 10 may include a radio access network 10A and a core network 10B. The radio access network 10A is shown as providing radio access to a wireless device 12, e.g., a user equipment (UE), via a radio network node 14. The radio access network 10A in turn provides access to the core network 10B, which may connect the wireless device 12 to one or more other networks or systems such as the Internet.

FIG. 2 illustrates a network node 18, shown as being in the core network 10B for instance. The network node 18 may for instance be a location server, e.g., implementing a Location Management Function (LMF), or may be configured to perform mobility management such as an access and mobility function (AMF). Regardless, the network node 18 provides assistance data 20 to the wireless device 12. The assistance data 20 assists the wireless device 12 with radio access technology dependent (RAT-dependent) positioning, i.e., so that the wireless device 12 itself can determine its position using RAT-dependent positioning. RAT-dependent positioning is any type of positioning that is dependent on the RAT(s) used by the radio access network 10A of the network 10. RAT-dependent positioning may include for instance downlink observed time difference of arrival (OT-DOA) or Enhanced Cell ID (E-CID). RAT-dependent positioning contrasts with RAT-independent positioning which is independent of the RAT(s) used by the radio access network 10A. RAT-independent positioning may include, for example, Assisted Global Navigation Satellite System (A-GNSS), Real-Time Kinematics (RTK), Precision Point Positioning (PPP), Differential A-GNSS, Wireless Local Area Network (WLAN) positioning, Bluetooth Sensor positioning, or the like.

Regardless, in some embodiments, the assistance data 20 is based on, e.g., as determined by the network node 18, device-specific information. The device-specific information may be stored at the network node 18, received at the network node 18 from the wireless device 12, generated or derived by the network node 18, or obtained by the network node 18 in any other way. The device-specific information includes any type of information that is specific to the wireless device 12. For example, this device-specific information may include one or more of: a subscription associated with the wireless device 12; one or more capabilities of the wireless device 12; one or more positioning requirements of the wireless device 12; one or more reasons that the wireless device 12 needs the assistance data 20; or location or path information of the wireless device 12. Regardless, that the assistance data 20 is based on the device-specific information means that the assistance data 20 is a function of or is otherwise dependent on the device-specific information.

Consider, for example, embodiments where the device-specific information includes a subscription associated with the wireless device 12. The subscription associated with the wireless device 12 is the subscription according to which the wireless device 12, or a subscriber operating the wireless device, is authorized to access the wireless communication network 10. In some embodiments, subscriptions to the wireless communication network 10 may have different possible levels. A relatively higher level subscription (e.g., gold subscription) may confer greater benefit than a relatively lower level subscription (e.g., bronze subscription), e.g., at a correspondingly greater monetary cost to the subscriber. In one such embodiment, the assistance data 20 provided to the wireless device 12 may be based on the subscription associated with the wireless device 12 in the sense that the assistance data 20 is based on a level of that subscription. For instance, the assistance data 20 may provide a relatively greater level of positioning assistance to a wireless device associated with a subscription of a relatively greater level (e.g., gold), and provide a relatively lesser level of positioning assistance to a wireless device associated with a subscription of a relatively lower level (e.g., bronze). In one example where the assistance data 20 provided to the wireless device 12 includes cell-specific information for one or more cells, how many cells for which the assistance data 20 includes cell-specific information may be based on the level of the subscription associated with the wireless device 12. The higher the level of the subscription, the more cells for which the assistance data 20 will include cell-specific information. The more cells for which the assistance data 20 includes cell-specific information, the greater the level of positioning assistance the assistance data 20 provides, e.g., the greater the positioning quality of service (QoS) attainable from the RAT-dependent positioning with assistance from the assistance data 20. Alternatively or additionally, which one or more types of cell-specific information the assistance data 20 includes may be based on the level of the subscription associated with the wireless device 12.

In these and other embodiments, for example, the assistance data 20 may include cell-specific information in the form of, for each of one or more cells, an identity of the cell, a location of the cell, a real-time difference between the cell and each of one or more others of the one or more cells, and/or a drift rate between the cell and each of one or more others of the one or more cells. In some embodiments, the cell-specific information may also include other configuration information to enable timing related measurements, e.g., downlink time difference of arrival. Regardless, the location, real-time difference, and/or drift rate may enable the wireless device 12 to determine its position to a greater level of accuracy the more cells for which the assistance data 20 includes that location, real-time difference, and/or drift rate. According to some embodiments, then, how many cells for which the assistance data 20 includes location, real-time difference, and/or drift rate is based on the subscription associated with the wireless device 12. Alternatively or additionally, which one or more types of the cell-specific information the assistance data 20 includes (e.g., which of the location, real-time difference, and/or drift rate the assistance data 20 includes) is based on the subscription associated with the wireless device 12. For example, whether the real-time difference information for each of the one or more cells is included in the assistance data 20 may depend on a level of the subscription associated with the wireless device 12. In one case, for instance, the assistance data 20 may only include real-time difference information if the level of the subscription is higher than a threshold level, e.g., the real-time difference information is included in the assistance data 20 for a gold subscription level but not a bronze subscription level. In these and other embodiments, then, the assistance data 20 provides greater positioning assistance via more cell-specific information and/or more helpful types of cell-specific information for higher subscription levels.

Consider, as another example, embodiments where the device-specific information includes one or more capabilities of the wireless device 12, and/or one or more positioning requirements of the wireless device 12. In one such embodiment, the assistance data 20 may provide a relatively greater level of positioning assistance to a wireless device that requires a relatively higher positioning QoS and/or that has greater memory and/or processing capabilities, and provide a relatively lesser level of positioning assistance to a wireless device that requires a relatively lower positioning QoS and/or that has lower memory and/or processing capabilities. In one example where the assistance data 20 provided to the wireless device 12 includes cell-specific information for one or more cells, how many cells for which the assistance data 20 includes cell-specific information may be based on the one or more capabilities of the wireless device 12 and/or the one or more positioning requirements of the wireless device 12, e.g., with the assistance data 20 including cell-specific information for a greater number of cells the greater the one or more positioning requirements and/or the one or more capabilities of the wireless device 12. Alternatively or additionally, which one or more types of cell-specific information the assistance data 20 includes may be based on the one or more positioning requirements and/or the one or more capabilities of the wireless device 12. In these and other embodiments, then, the assistance data 20 provides greater positioning assistance via more cell-specific information and/or more helpful types of cell-specific information for wireless devices with more demanding positioning requirements and/or higher capabilities.

Consider, as yet another example, embodiments where the device-specific information includes location or path information of the wireless device 12. In one such embodiment, the assistance data 20 may provide assistance that is tailored to the particular location or path information of the wireless device 12. In one example where the assistance data 20 provided to the wireless device 12 includes cell-specific information for one or more cells, for which one or more cells the assistance data 20 includes cell-specific information is based on the location or path information of the wireless device 12. The one or more cells for which the assistance data 20 includes cell-specific information may for instance comprise one or more cells in or near a path that the wireless device 12 is or is expected to move according to the location or path information of the wireless device 20.

Note that while the above embodiments have been described with respect to one or more cells, the embodiments may be equally applied to one or more so-called clusters of cells. A cluster of cells may refer to any group of multiple cells that provide coverage over respective areas that are geographically contiguous with one another. In one embodiment, different clusters of cells may be deployed in different types of radio environments (e.g., urban vs. rural) and/or may provide different levels of capacity (e.g., high vs. low). Alternatively or additionally, different clusters of cells may correspond different respective Radio Network Areas (RNAs), also referred to as RAN-based Notification Areas, where such RNAs represent the granularity with which the wireless device's position is known to the network 10 while the wireless device is in a Radio Resource Control (RRC) Inactive state. Regardless of the particular nature of a cluster of cells, in some embodiments, which one or more clusters of cells the assistance data 20 includes cell-specific information is based on the device-specific information. Alternatively or additionally, for how many clusters of cells the assistance data 20 includes cell-specific information is based on the device-specific information.

Similarly, the embodiments may be equally applied to one or more so-called zones of clusters. A zone of clusters may refer to any group of multiple clusters of cells whose cells provide coverage over respective areas that are geographically contiguous with one another. In this case, as examples, which one or more zones of clusters the assistance data 20 includes cell-specific information is based on the device-specific information. Alternatively or additionally, for how many zones of clusters the assistance data 20 includes cell-specific information is based on the device-specific information.

Figure 3:
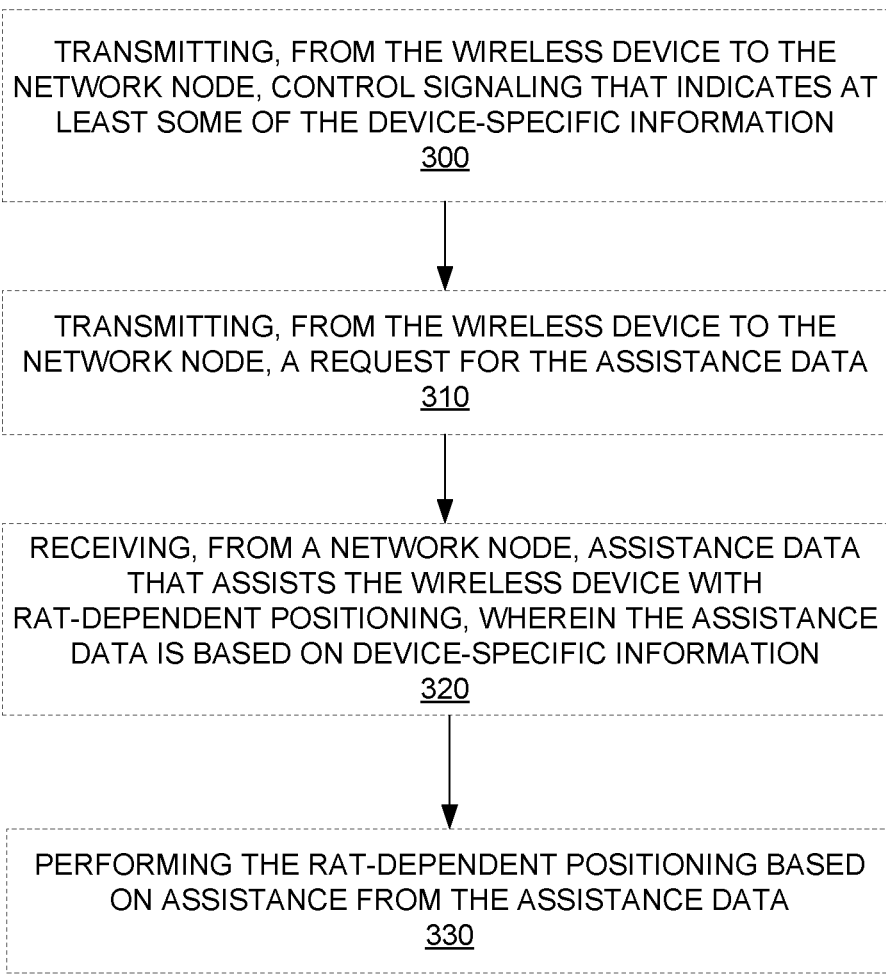
FIG. 3 is a logic flow diagram of a method performed by a wireless device according to some embodiments.

In view of the above modifications and variations, FIG. 3 in this regard depicts a method performed by a wireless device 12 for radio access technology, RAT, dependent positioning in accordance with particular embodiments. The method in some embodiments includes receiving, from a network node 18 such as a location server, assistance data 20 that assists the wireless device 12 with RAT-dependent positioning, e.g., downlink OTDOA (Block 320). In some embodiments, the assistance data 20 is based on device-specific information. The device-specific information may for example include one or more of: a subscription associated with the wireless device 12; one or more capabilities of the wireless device 12; one or more positioning requirements of the wireless device 12; one or more reasons that the wireless device 12 needs the assistance data 20; or location or path information of the wireless device 20.

In some embodiments, the assistance data 20 includes cell-specific information for one or more cells. For example, in some embodiments, for each of the one or more cells, the cell-specific information includes one or more of: an identity of the cell; a location of the cell; a real-time difference between the cell and each of one or more others of the one or more cells; or a drift rate between the cell and each of one or more others of the one or more cells. Regardless, in some embodiments, for which one or more cells the assistance data 20 includes cell-specific information is based on the device-specific information; that is, which cell(s) the assistance data 20 relates to is based on the device-specific information. Alternatively or additionally, in some embodiments, for how many cells the assistance data 20 includes cell-specific information is based on the device-specific information. Alternatively or additionally, which one or more types of cell-specific information the assistance data 20 includes is based on the device-specific information.

In any event, the method in some embodiments may alternatively or additionally include transmitting, from the wireless device 12 to the network node 18, control signaling that indicates at least some of the device-specific information (Block 300). The control signaling may for instance be included in a mobile originated location request message.

The method may alternatively or additionally include, transmitting from the wireless device 12 to the network node 18, a request for the assistance data 20 (Block 310).

The method in any event may finally include performing the RAT-dependent positioning based on assistance from the assistance data 20 (Block 330).

Figure 4:
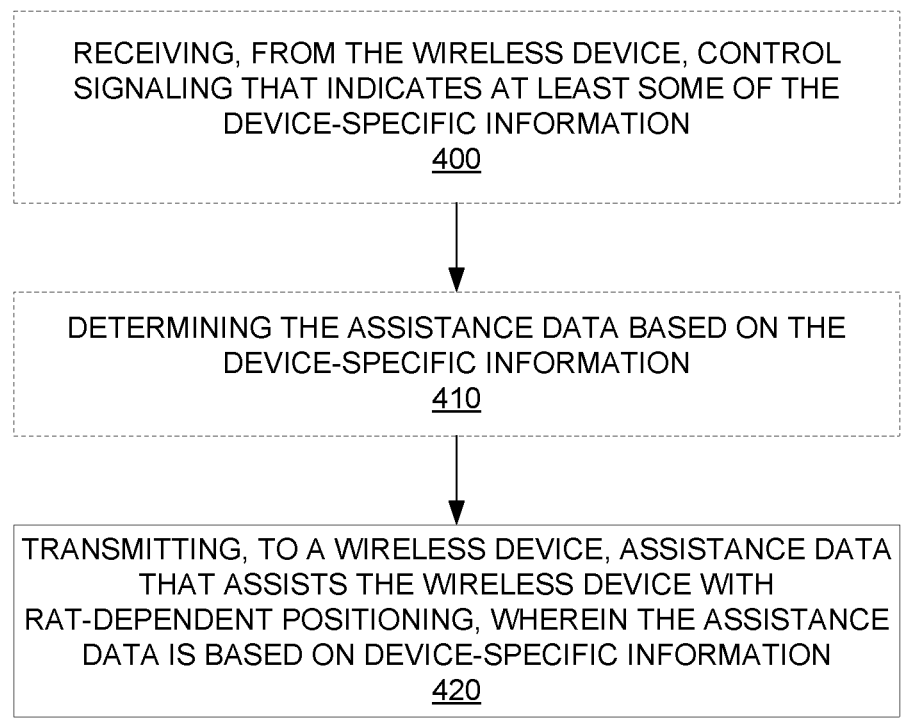
FIG. 4 is a logic flow diagram of a method performed by a network node according to some embodiments.

FIG. 4 depicts a method performed by a network node 18, e.g., a location server, for assisting with radio access technology, RAT, dependent positioning in accordance with other particular embodiments. The method in some embodiments includes transmitting, from the network node 18 to a wireless device 12, assistance data 20 that assists the wireless device with RAT-dependent positioning, e.g., downlink OTDOA (Block 420). In some embodiments, the assistance data 20 is based on device-specific information. The device-specific information may for example include one or more of: a subscription associated with the wireless device 12; one or more capabilities of the wireless device 12; one or more positioning requirements of the wireless device 12; one or more reasons that the wireless device 12 needs the assistance data 20; or location or path information of the wireless device 12.

In some embodiments, the assistance data 20 includes cell-specific information for one or more cells. For example, in some embodiments, for each of the one or more cells, the cell-specific information includes one or more of: an identity of the cell; a location of the cell; a real-time difference between the cell and each of one or more others of the one or more cells; or a drift rate between the cell and each of one or more others of the one or more cells. Regardless, in some embodiments, for which one or more cells the assistance data 20 includes cell-specific information is based on the device-specific information; that is, which cell(s) the assistance data 20 relates to is based on the device-specific information. Alternatively or additionally, in some embodiments, for how many cells the assistance data 20 includes cell-specific information is based on the device-specific information. Alternatively or additionally, which one or more types of cell-specific information the assistance data 20 includes is based on the device-specific information.

In some embodiments, the method may further include determining the assistance data 20 based on the device-specific information (Block 410). For example, the determining may comprise determining, based on the device-specific information, one or more of: (i) for which one or more cells, one or more clusters of cells, and/or one or more zones of cell clusters the assistance data 20 is to include cell-specific information; (ii) for how many cells, clusters of cells, and/or zones of cell clusters the assistance data 20 is to include cell-specific information; or (iii) which one or more types of cell-specific information the assistance data 20 is to include for each of one or more cells, one or more clusters of cells, or one or more zones of cell clusters.

The method may alternatively or additionally include receiving, from the wireless device 12, control signaling that indicates at least some of the device-specific information. The control signaling may for instance be included in a mobile originated location request message.

Figure 5:
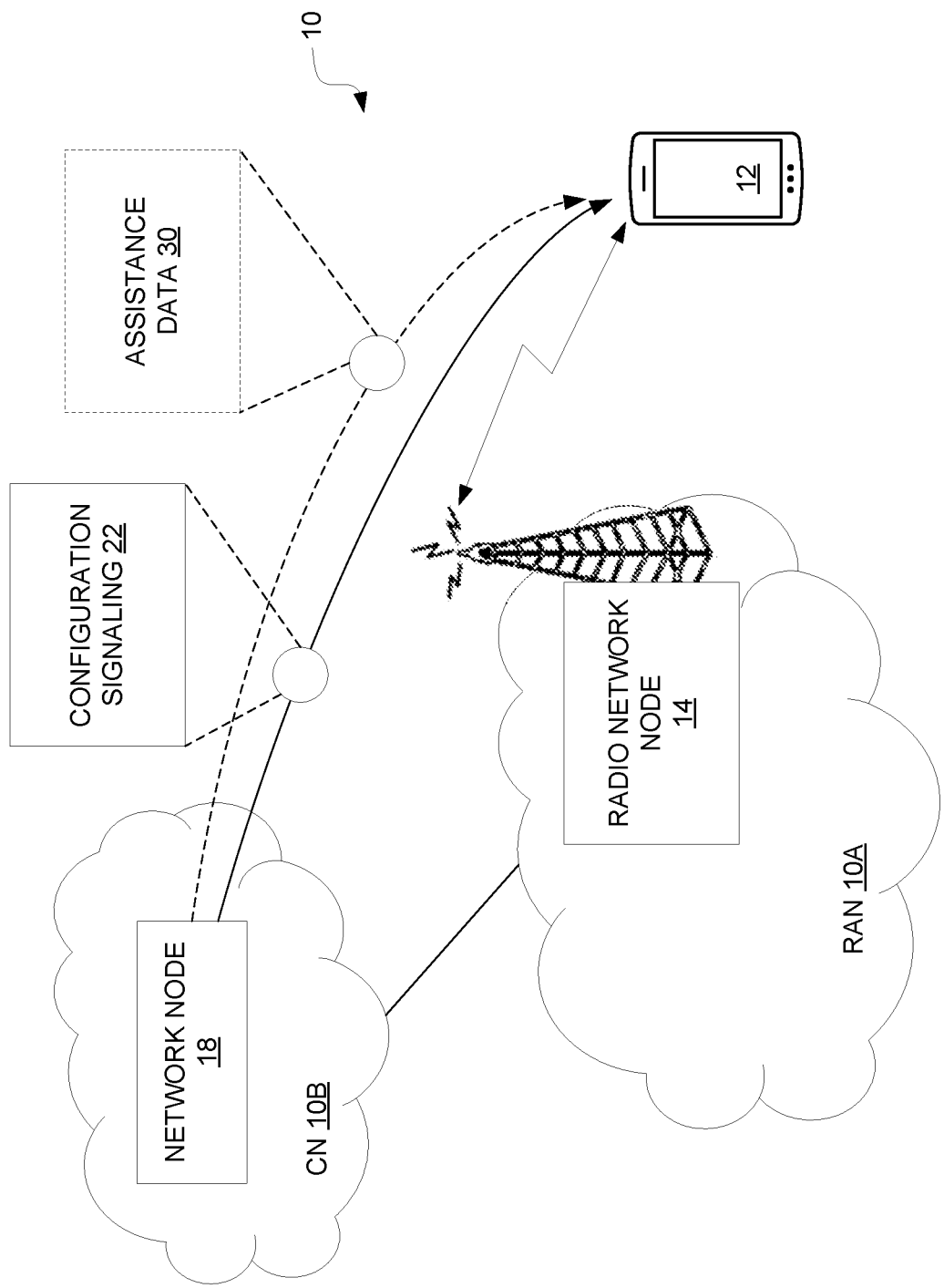
FIG. 5 is a block diagram of a wireless communication network according to other embodiments.

FIG. 5 shows the wireless communication network 10 according to alternative or additional embodiments. Unless otherwise indicated, like-numbered components in the network 10 are as described above with respect to FIG. 2. The network node 18 in some embodiments provides assistance data 30 to the wireless device 12 that may be the same as or different than the assistance data 20 described above with respect to Figure ZO. The assistance data 30 similarly assists the wireless device 12 with device-based (e.g., UE-based) positioning, e.g., downlink observed time difference of arrival (OTDOA). Device-based positioning in this regard refers to the wireless device 12 determining its own position with assistance from the network 10. This contrasts with device-assisted positioning in which the wireless device would send measurements to the network for the network to determine the device's position, and contrasts with stand-alone positioning in which the wireless device would determine its own position without assistance from the network.

FIG. 5 illustrates the network node 18 as alternatively or additionally transmitting configuration signaling 22 to the wireless device 12. In some embodiments, the configuration signaling 22 configures the wireless device 12 to, while the wireless device 12 is in an idle mode or an inactive mode (e.g., an RRC Idle mode or an RRC Inactive mode), obtain device-based positioning information using the assistance data 30. In some embodiments, the configuration signaling 22 alternatively or additionally configures the wireless device 12 to store the device-based positioning information at the wireless device 12 at least until the wireless device 12 reports the device-based positioning information in a connected mode (e.g., an RRC Connected mode). The configuration signaling 22 in other embodiments alternatively or additionally configures the wireless device 12 to report the device-based positioning information in the connected mode when a reporting condition is met. Such reporting condition may include for instance expiry of a response time indicated by the configuration signaling 22; termination of a positioning session; or a need for the wireless communication network 10 to verify a positioning estimate determined by the wireless device 12.

Figure 6:
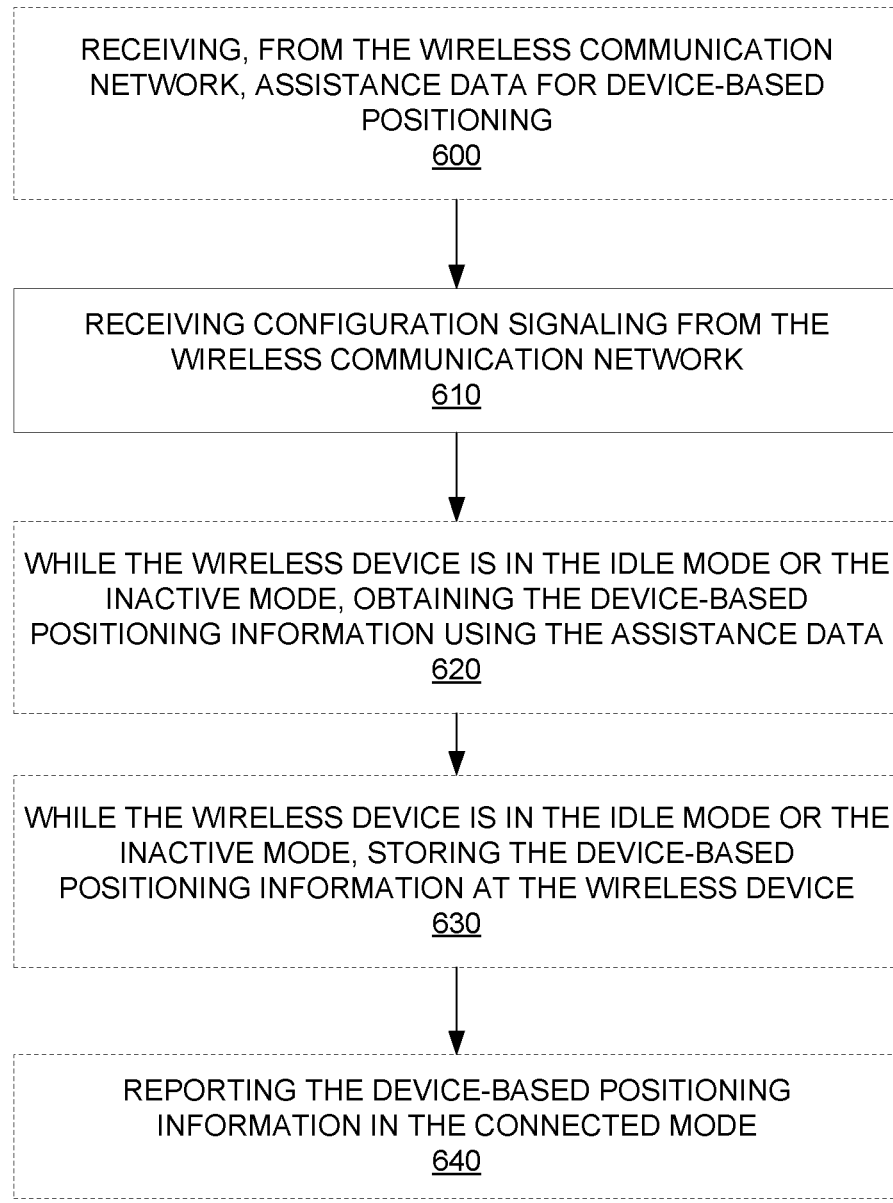
FIG. 6 is a logic flow diagram of a method performed by a wireless device according to other embodiments.

FIG. 6 in this regard depicts a method performed by a wireless device 12 for device-based positioning in a wireless communication network 10 in accordance with particular embodiments. The method may includes receiving, from the wireless communication network 10, assistance data 30 for device-based positioning (Block 600). In some embodiments, the method further includes receiving configuration signaling 22 from the wireless communication network 10 (Block 610). In one or more embodiments, the configuration signaling 22 configures the wireless device 12 to, while the wireless device 12 is in an idle mode or an inactive mode, obtain device-based positioning information using the assistance data 30.

In some embodiments, the configuration signaling 22 configures the wireless device 12 to store the device-based positioning information at the wireless device 12 at least until the wireless device 12 reports the device-based positioning information in a connected mode. The configuration signaling 22 in other embodiments alternatively or additionally configures the wireless device 12 to report the device-based positioning information in the connected mode when a reporting condition is met. Such reporting condition may include for instance expiry of a response time indicated by the configuration signaling; termination of a positioning session; or a need for the wireless communication network 10 to verify a positioning estimate determined by the wireless device 12.

In any event, the method as shown may further include, based on the configuration signaling 22 and while the wireless device 12 is in the idle mode or the inactive mode, obtaining the device-based positioning information using the assistance data 30 (Block 620). The method may alternatively or additionally include, based on the configuration signaling 22 and while the wireless device 12 is in the idle mode or the inactive mode, storing the device-based positioning information at the wireless device 12 (Block 630). Finally, the method in some embodiments includes based on the configuration signaling 22, reporting the device-based positioning information in the connected mode (Block 640).

Figure 7:
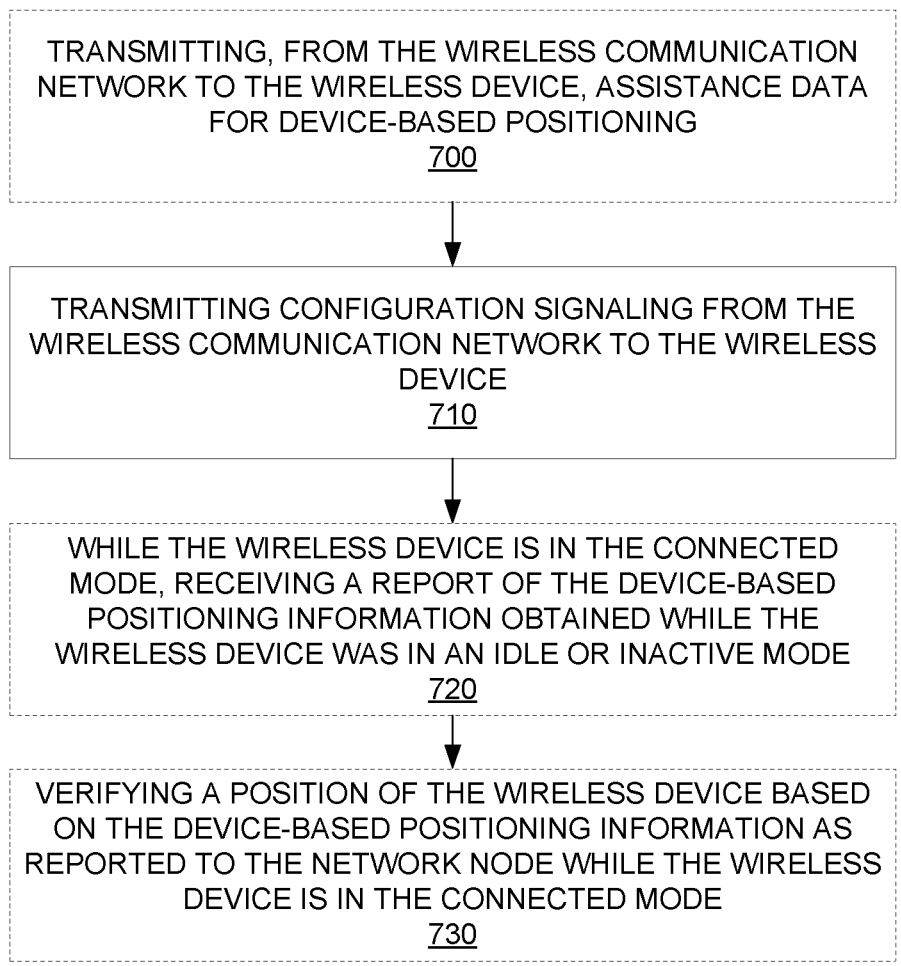
FIG. 7 is a logic flow diagram of a method performed by a network node according to other embodiments.

FIG. 7 depicts a method performed by a network node 18 in a wireless communication network 10 for configuring device-based positioning in accordance with other particular embodiments. The method may include transmitting, to a wireless device 12, assistance data 30 for device-based positioning (Block 700). In some embodiments, the method also includes transmitting configuration signaling 22 from the network node 18 to the wireless device 12 (Block 710). In one or more embodiments, the configuration signaling 22 configures the wireless device 12 to, while the wireless device 12 is in an idle mode or an inactive mode, obtain device-based positioning information using the assistance data 30.

In some embodiments, the configuration signaling 22 configures the wireless device 12 to store the device-based positioning information at the wireless device 12 at least until the wireless device 12 reports the device-based positioning information in a connected mode. The configuration signaling 22 in other embodiments alternatively or additionally configures the wireless device 12 to report the device-based positioning information in the connected mode when a reporting condition is met. Such reporting condition may include for instance expiry of a response time indicated by the configuration signaling; termination of a positioning session; or a need for the wireless communication network 10 to verify a positioning estimate determined by the wireless device 12.

In any event, the method as shown may further include, in accordance with the configuration signaling 22, receiving a report of the device-based positioning information while the wireless device 12 is in the connected mode (Block 720).

In some embodiments, the method may comprise verifying a position of the wireless device 12 based on the device-based positioning information as reported to the network node 18 while the wireless device 12 is in the connected mode (Block 730).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
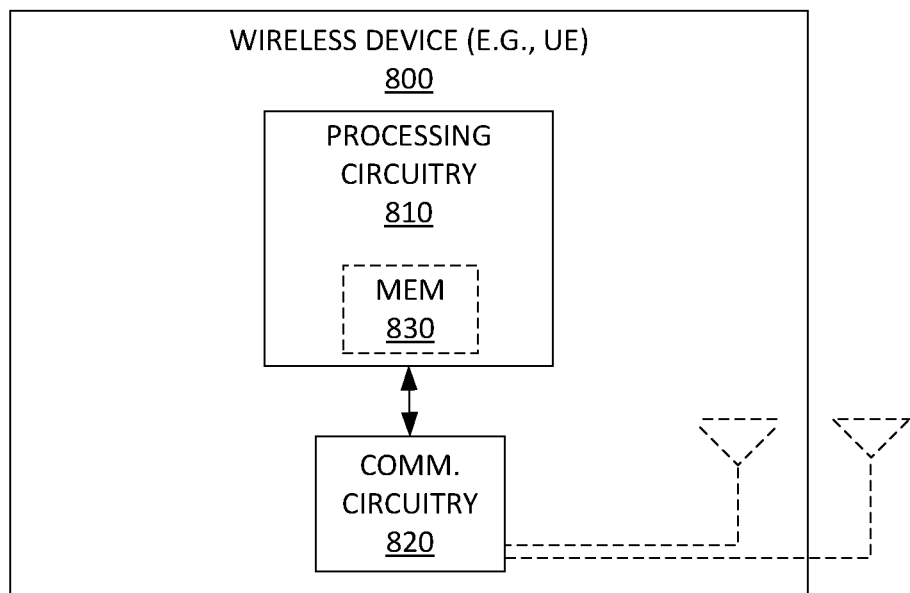
FIG. 8 is a block diagram of a wireless device according to some embodiments.

FIG. 8 for example illustrates a wireless device 800, e.g., wireless device 12, as implemented in accordance with one or more embodiments. As shown, the wireless device 800 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the wireless device 800. The processing circuitry 810 is configured to perform processing described above, e.g., in FIG. 3 and/or FIG. 16, such as by executing instructions stored in memory 830. The processing circuitry 810 in this regard may implement certain functional means, units, or modules.

Figure 9:
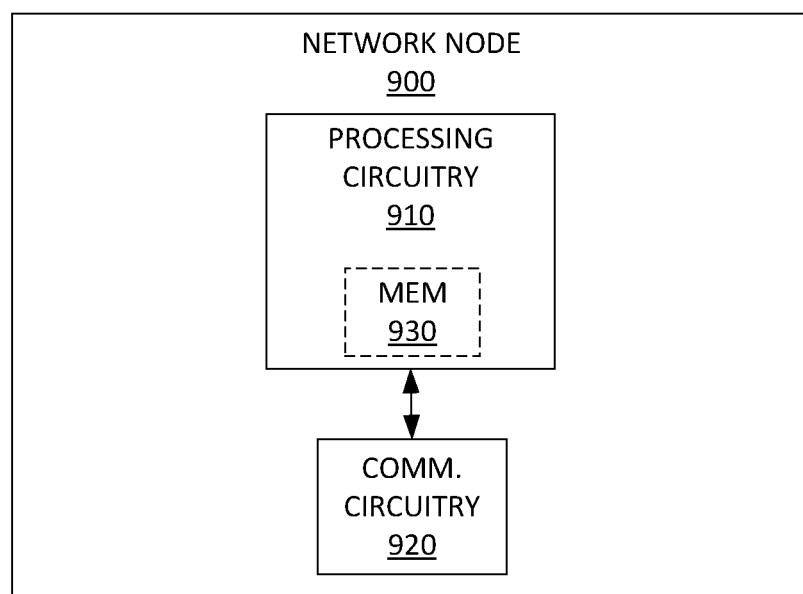
FIG. 9 is a block diagram of a network node according to some embodiments.

FIG. 9 illustrates a network node 900, e.g., network node 18, as implemented in accordance with one or more embodiments. As shown, the network node 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, e.g., in FIG. 4 and/or FIG. 17, such as by executing instructions stored in memory 930. The processing circuitry 910 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 10:
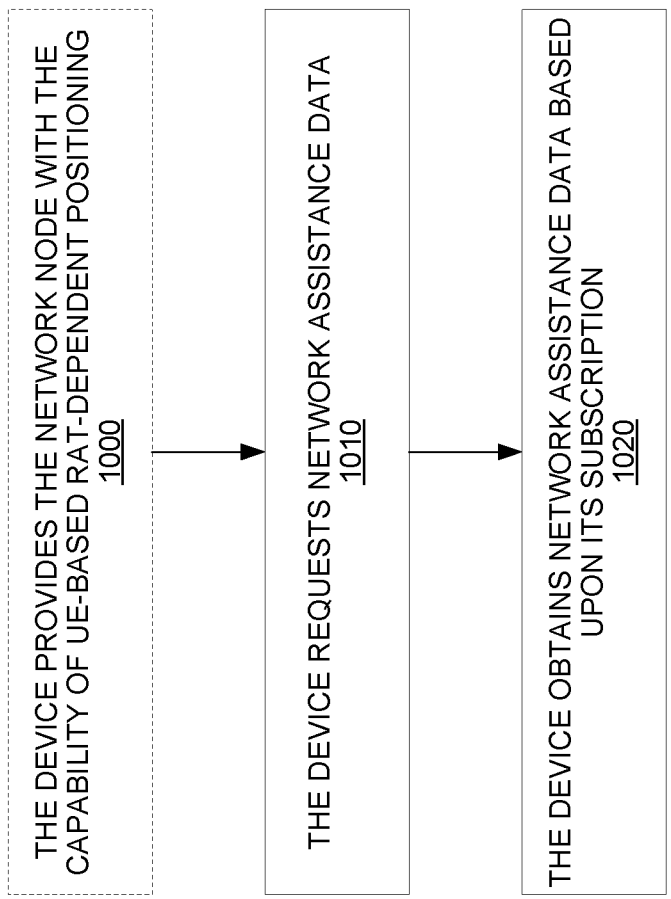
FIG. 10 is a logic flow diagram of a method performed by a wireless device according to other embodiments.

FIG. 10 illustrates some embodiments from the perspective of a wireless device. As shown, the wireless device provides a network node with the capability of UE-based RAT-dependent positioning method (Block 1000). The wireless device then requests network assistance data (Block 1010). The wireless device thereafter obtains network assistance data based upon its subscription (Block 1020).

Figure 11:
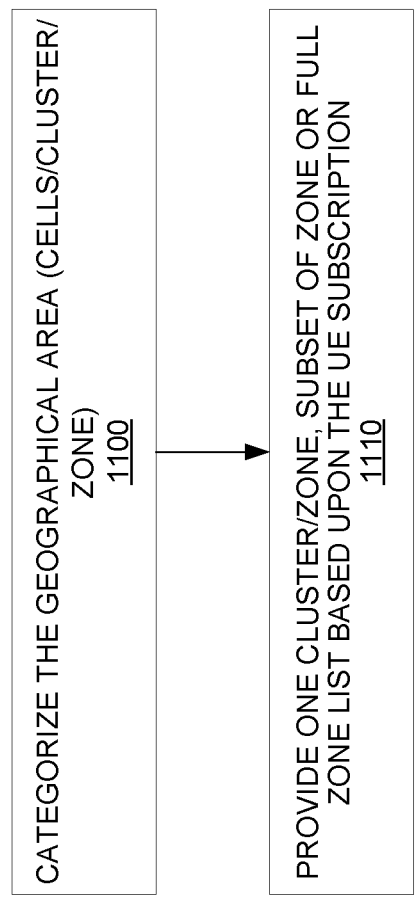
FIG. 11 is a logic flow diagram of a method performed by a location server according to some embodiments.

UE. FIG. 11 illustrates some embodiments from the perspective of a location server, e.g., location management function, LMF. As shown, the location server categorizes the geographical area (cells/cluster/zone) (Block 1100). The location server also provides one cluster/zone, subset of zone, or full zone list based upon the UE subscription (Block 1110).

Figure 12:
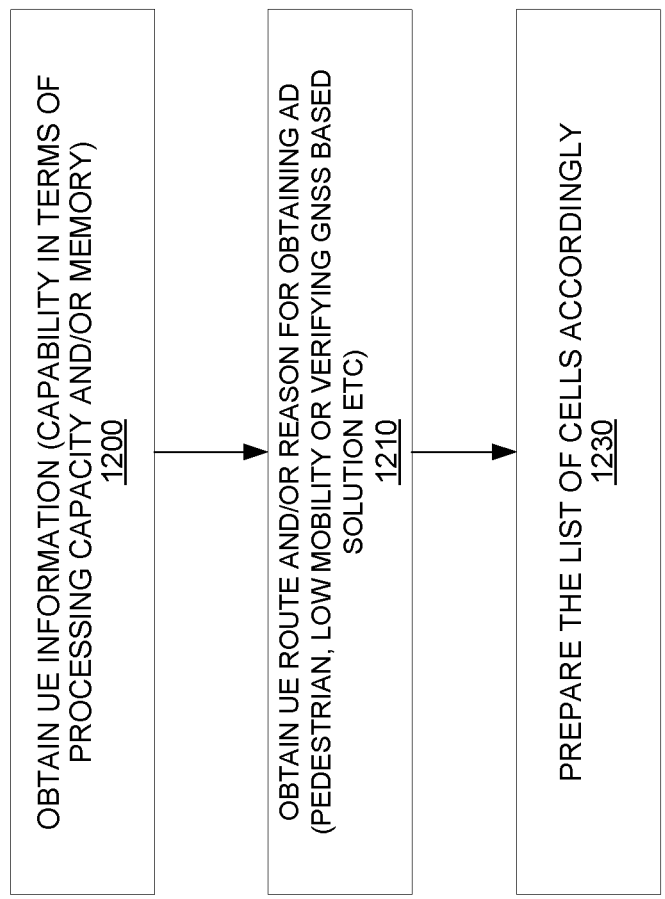
FIG. 12 is a logic flow diagram of a method performed by a location server according to other embodiments.

FIG. 12 illustrates other embodiments from the perspective of a location server, e.g., location management function, LMF. As shown, the location server obtains UE information (capability in terms of processing capacity and/or memory) (Block 1200). The location server also obtains UE route and/or reason for obtaining assistance data (pedestrian, low mobility or verifying GNSS based solution, etc.) (Block 1210). The location server furthermore prepares the list of cells accordingly (Block 1230).

Generally, then, some embodiments provide a simplified Positioning Architect and RAN procedure to cater NG-RAN to be (e.g., act as or embed) Location Services (LCS) and Location Management Component (LMC).

Certain embodiments may provide one or more of the following technical advantage(s). Some embodiments make it easier to maintain the subscription hierarchy and provide means for charging for the operators from the customer.

Figure 13:
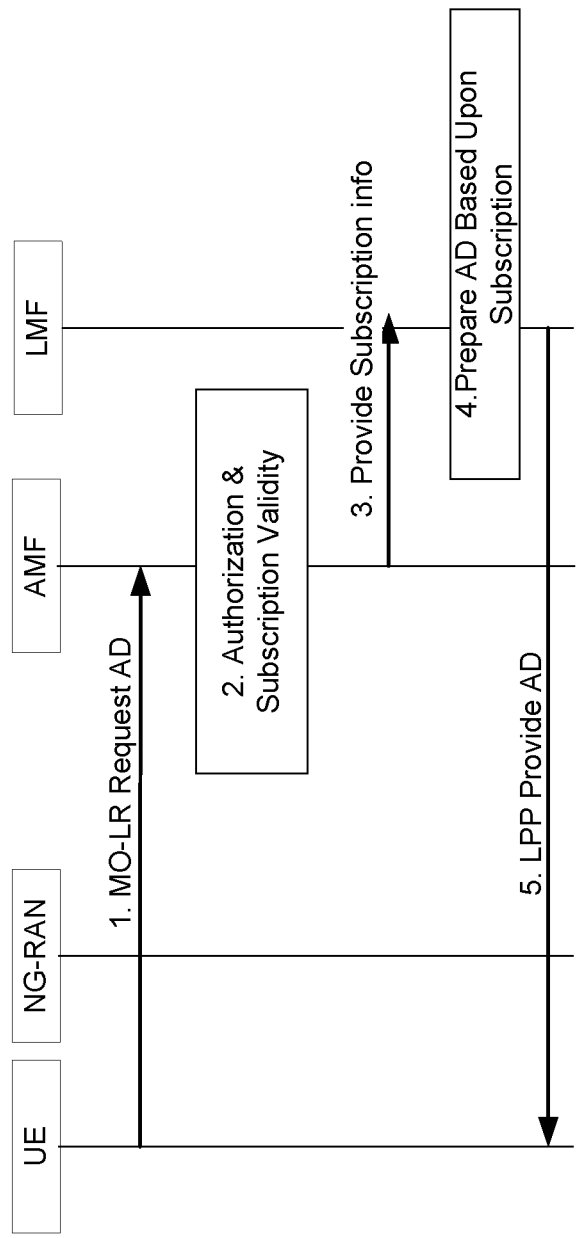
FIG. 13 is a call flow diagram for delivering assistance data for UE-based positioning according to some embodiments.
Figure 14:
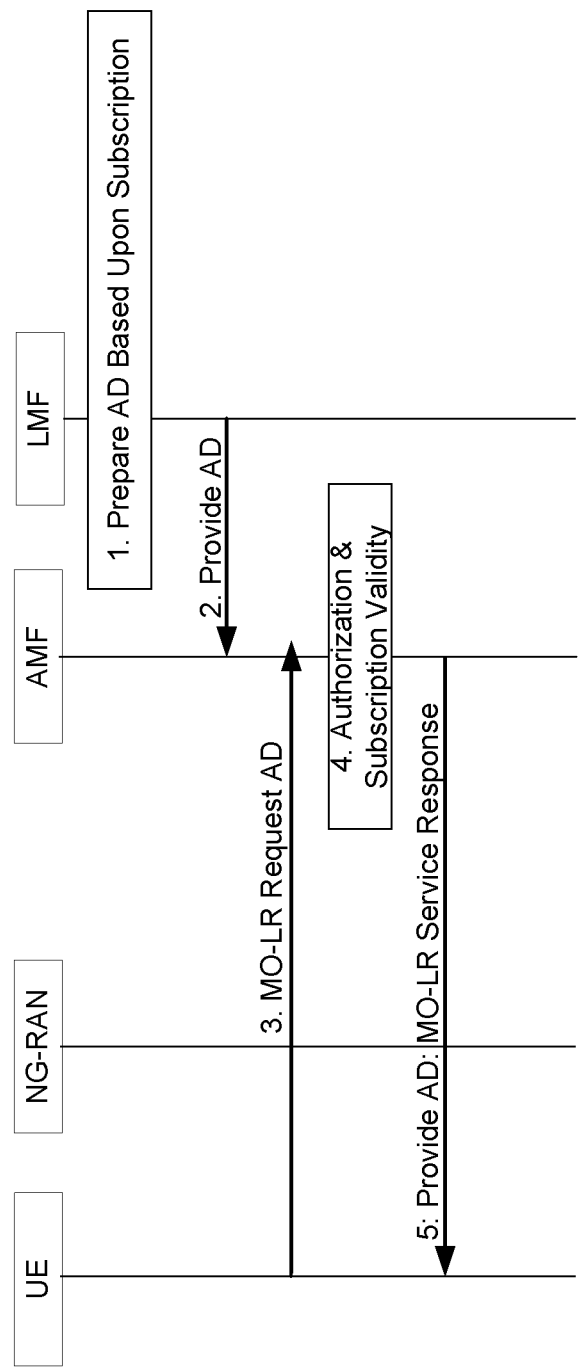
FIG. 14 is a call flow diagram for delivering assistance data for UE-based positioning according to other embodiments.

In more detail, for RAT dependent DL OTDOA Based positioning method, the Location Management Function (LMF) according to some embodiments may provide the below Assistance Data so that the UE may compute its location.
  a) List of Cell IDs and its Location (Transmission Point co-ordinates)
  b) Real Time Difference (RTD) between the Cells
  c) Any known drift rate between the cells FIGS. 13 and 14 illustrate options to support the UE based Positioning method Assistance Data Delivery. As shown in FIG. 13, the UE transmits a mobile originated (MO) location request (LR) request for assistance data (AD) to the Access and Mobility Function (AMF) (Step 1). The AMF then performs authorization and subscription validity (Step 2). The AMF next provides subscription information to the Location Management Function (LMF) Step 3). The LMF correspondingly prepares the AD based upon the subscription (Step 4) and provides the AD to the UE via the LTE Positioning Protocol (LPP) (Step 5).

As shown in FIG. 14, the LMF prepares AD based upon a subscription (Step 1). The LMF then provides the AD to the AMF (Step 2). The UE thereafter sends a MO-LR request for AD to the AMF (Step 3). The AMF performs authorization and subscription validity (Step 4), and provides the AD to the UE in a MO-LR service response (Step 5).

In some embodiments, the LMF prepares one or more clusters (group of cells) with respect to each cell. The group of cells (cluster) may comprise immediate neighbor cells and the cells in outer vicinity where the UE can be expected to traverse. In some embodiments, the LMF prepares a cluster based upon previously known path of UE or based upon a machine learning technique as where the UEs mostly traverses.

In some embodiments, the LMF may categorize clusters into Zones. A zone is made of one or more clusters.

In some embodiments, the LMF provides one or more zones to the UE based upon the subscription and/or current location of the UE (location based upon cell id, beam id). LMF may obtain the cell id and/or beam id information from AMF via MO-LR message or from E-CID procedure if the UE already has an ongoing LPP session.

In one of the embodiments as shown in FIG. 14, one or more of the procedures may be performed by AMF.

In one of the embodiments, the core network entity (e.g., LMF or AMF) considers the UE capability in terms of memory and processing capability before providing the Assistance Data or basically in determining in providing the number of cells (cell, cluster, multiple cluster, zones).

In one of the embodiments, the core network entity (e.g., LMF or AMF) considers the QoS of the location estimation required and depending upon that decides how many numbers of cells (cell, cluster, multiple cluster, zones) to provide. Further for a low QoS or for a lower subscription level, the CN may skip the RTD, e.g., so as not to include it in the assistance data.

In one of the embodiments, the UE provides its positioning capability via mobile originated location request (MO-LR) message. Such capability is used by network to determine the scope of Assistance data. For instance, depending upon the memory capacity of the UE, the network may decide how many clusters/zones to provide to the UE.

In one embodiment, the LMF provides information about validity time of the assistance data. After expiration of the validity time, the UE needs to again request assistance data to get valid assistance data.

In one of the embodiments, the UE provides routing path; the input can be simplified such that it can be distance and direction, such as 100 km North.

In one of the embodiments, the UE provides the reason for obtaining the assistance data (AD). The reason can be specified in MO-LR message. The reasons can be, for example, (i) Pedestrian Navigation; (ii) Low Mobility Vehicular Navigation (City, Urban area); (iii) High Speed Mobility (Highway); or (iv) to verify location obtained from other source such as GNSS or for location based upon hybrid solution.

In one of the embodiments, the Location server prepares the cell list for DL OTDOA based upon Radio Network Area (RNA).

Figure 15:
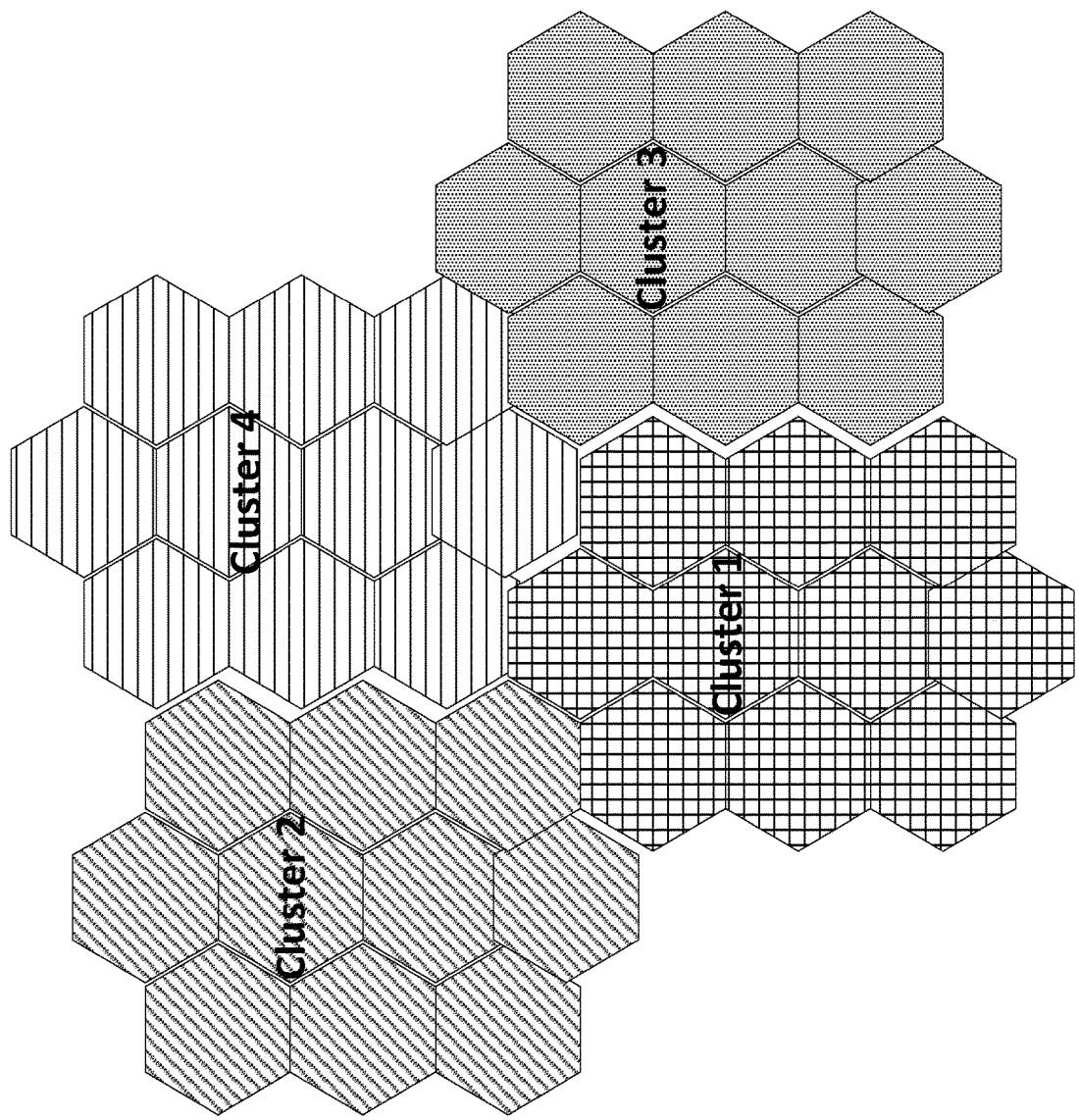
FIG. 15 is a block diagram of clusters of cells according to some embodiments.

FIG. 15 shows each Hexagon as representing a cell. Cells with the same pattern belong to a cluster. It is possible to configure the cluster in a group. Cluster 2 and cluster 4 for instance could belong to the same zone (zone 1) whereas cluster 1 and 3 could belong to different zones; zone 2 and zone 3 respectively.

Consider now other embodiments herein that alternatively or additionally support RRC Inactive and/or Idle mode measurement configuration and reporting for positioning.

Figure 16:
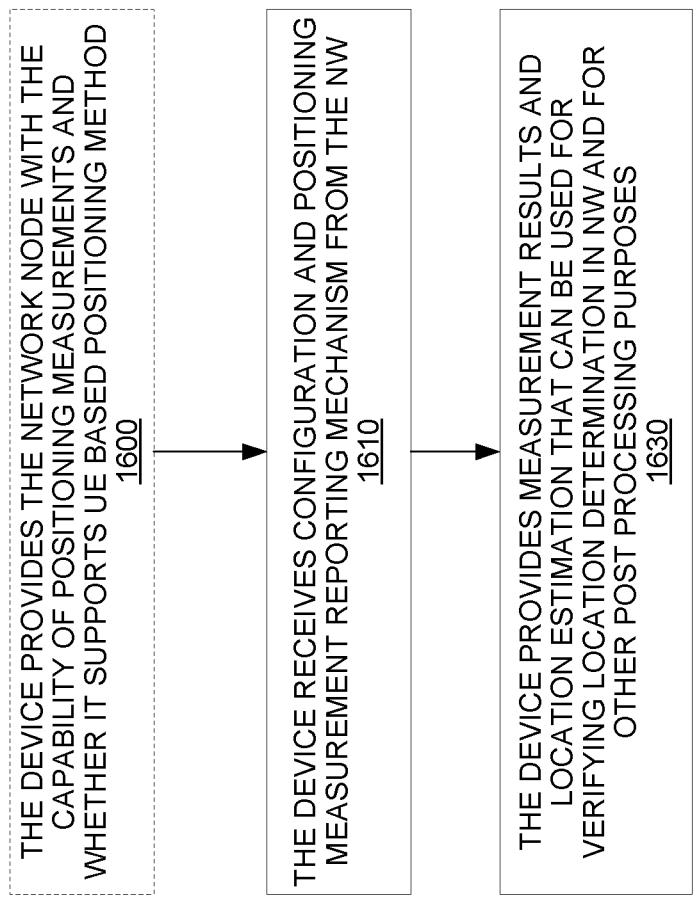
FIG. 16 is a logic flow diagram of a method performed by a wireless device according to still other embodiments.

FIG. 16 shows some embodiments from the perspective of the wireless device, e.g., UE. As shown in FIG. 16, the wireless device provides a network node with the capability of positioning measurements and whether it supports a UE-based positioning method (Block 1600). The wireless device also receives configuration and positioning measurement reporting mechanism from the network (Block 1610). The wireless device furthermore provides measurement results and location estimation that can be used for verifying location determination in the network and for other post-processing purposes (Block 1630).

Figure 17:
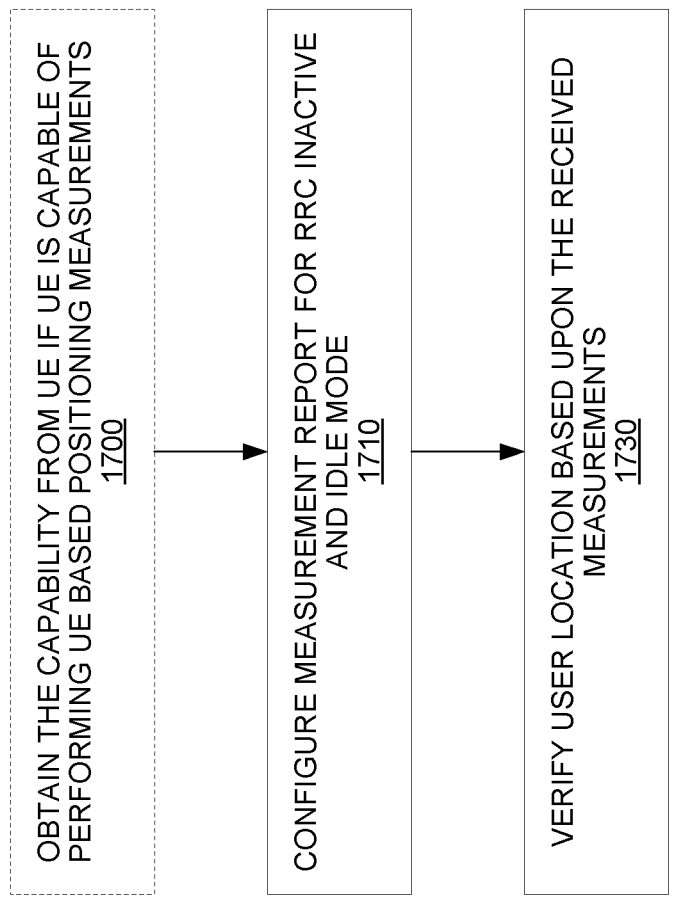
FIG. 17 is a logic flow diagram of a method performed by a wireless communication network according to still other embodiments.

FIG. 17 shows some embodiments from the perspective of the network. As shown in FIG. 17, the network obtains the capability from the UE if the UE is capable of performing UE-based positioning measurements (Block 1700). The network also configures measurement reporting for RRC inactive and idle mode (Block 1710). The network furthermore verifies user location based upon the received measurements (Block 1730).

Figure 18:
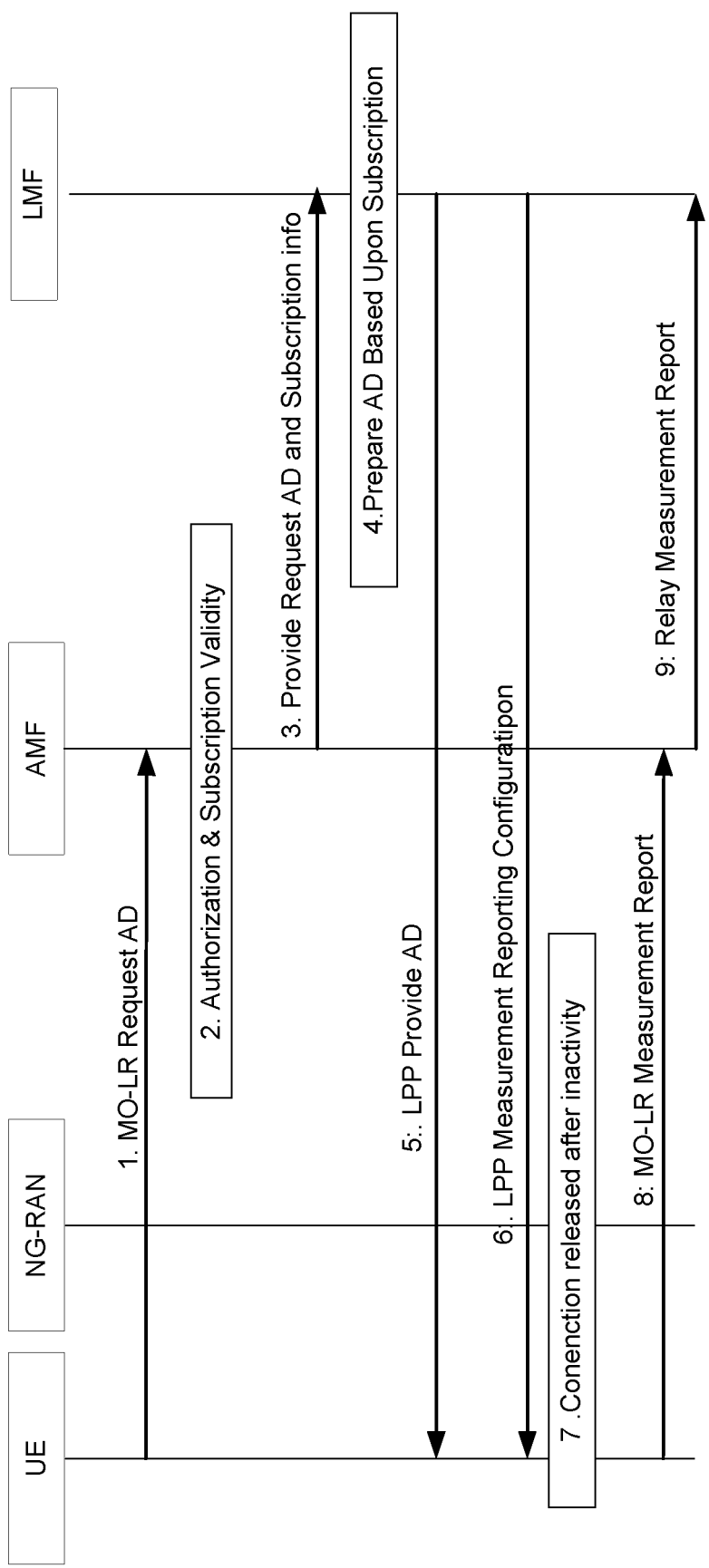
FIG. 18 is a call flow diagram for configuring measurement reporting for UE-based RAT-dependent positioning according to some embodiments.

In more detail, FIG. 18 shows Measurement Reporting Configuration for UE based RAT Dependent Positioning Method. As shown in FIG. 18, the UE sends a MO-LR Request for AD to the AMF (Step 1). The AMF performs authorization and subscription validity (Step 2), and provides the Request for AD and subscription information to the LMF (Step 3). The LMF prepares the AD based upon the subscription (Step 4) and provides the AD to the UE via LPP (Step 5). The LMF also provides a measurement reporting configuration via LPP to the UE (Step 6). The connection is released after inactivity (Step 7). The UE then sends a MO-LR measurement report to the AMF (Step 8), whereupon the AMF relays the measurement report to the LMF (Step 9).

Accordingly, in one embodiment, a new message (shown in FIG. 18 as an LPP Measurement Reporting Configuration) is signaled to the UE to configure the idle and RRC Inactive mode measurement configuration. This new message is one example of configuration signaling 22 in FIG. 5. In some embodiments, this message can be also be piggybacked in or on another DL message from the LMF such as provide assistance data.

Figure 19:
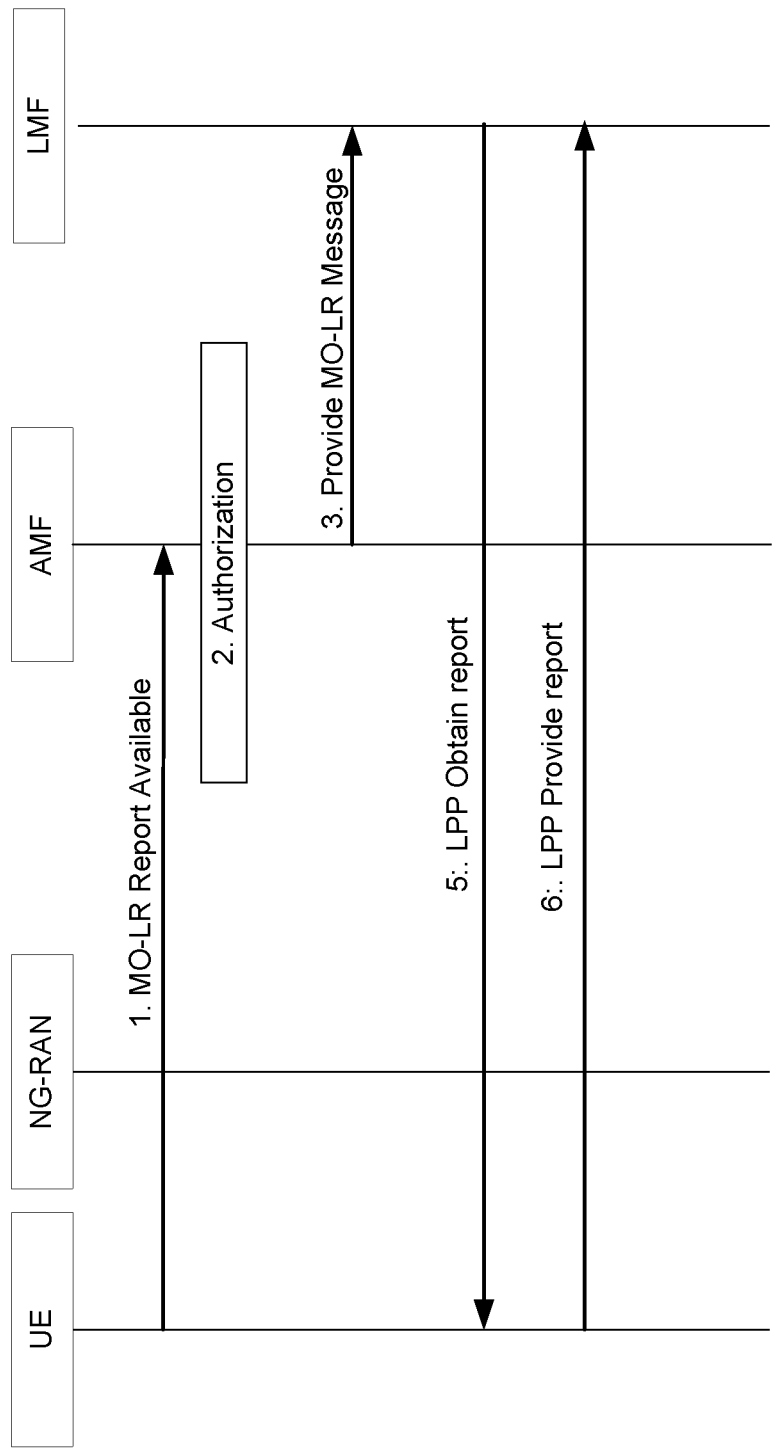
FIG. 19 is a call flow diagram of a procedure for obtaining an offline report for positioning according to some embodiments.

In some embodiments, the measurement configuration (e.g., as indicated by configuration signaling 22 such as the new message in this example) comprises one or more of:
 a) Events when the UE should store the measurement results and location information. For example, an event can be when the UE switches to use cells from cluster 1 to cluster 2 (see FIG. 15). In some cases, when the network has mapped the cluster with respect to Radio Network area (RNA), the UE logs the measurement when switching from one RNA to another RNA.
 b) Criteria for when the UE should perform measurement. For example, based upon UE perceived geometric dilution of precision (GDOP) and/or reference signal received power (RSRP); if there is fluctuation in the value of GDOP and/or RSRP and that fluctuation exceeds a threshold, the UE should store the measurement results and location.
 c) Response Time In some embodiments, the measurement report from the UE comprises one or more of:
 a) Time stamps (Coordinated Universal Time, UTC, System Frame Number, SFN, etc.)
 b) list of cells where the UE performed measurements
 c) The respective measurements such as Time of Arrival (TOA), Reference Signal Time Difference (RSTD), Reference Signal Received Power (RSRP) etc. at each time stamp In one embodiment, the UE initiates the connection for example using MO-LR on the expiry of response time or after the positioning session has ended or when the UE wants the network to verify the results of its positioning determination. In all such cases, the UE sends the measurement report as shown in sequence 8 of FIG. 18. In an alternate embodiment, the UE flags that it has an offline report and it is up to the network to receive using an LPP message. The fetching can be obtained using new LPP messages shown in FIG. 19. In particular, FIG. 19 shows Positioning Procedure to obtain offline report. As shown, the UE transmits a MO-LR Report Available message to the AMF (Step 1). The AMF performs authorization (Step 2) and provides an MO-LR message to the LMF (Step 3). The LMF transmits an LPP Obtain report message to the UE (Step 5) and the UE responds with an LPP Provide report message (Step 6).

In one embodiment, the UE may toggle the capability from UE based to UE assisted or UE assisted to UE based. The UE can notify the switch of capability using a message such as MO-LR. The decision to switch can be based upon criteria such as UE processing capability and memory requirement, and/or QoS (latency/accuracy) requirements.

Figure 20:
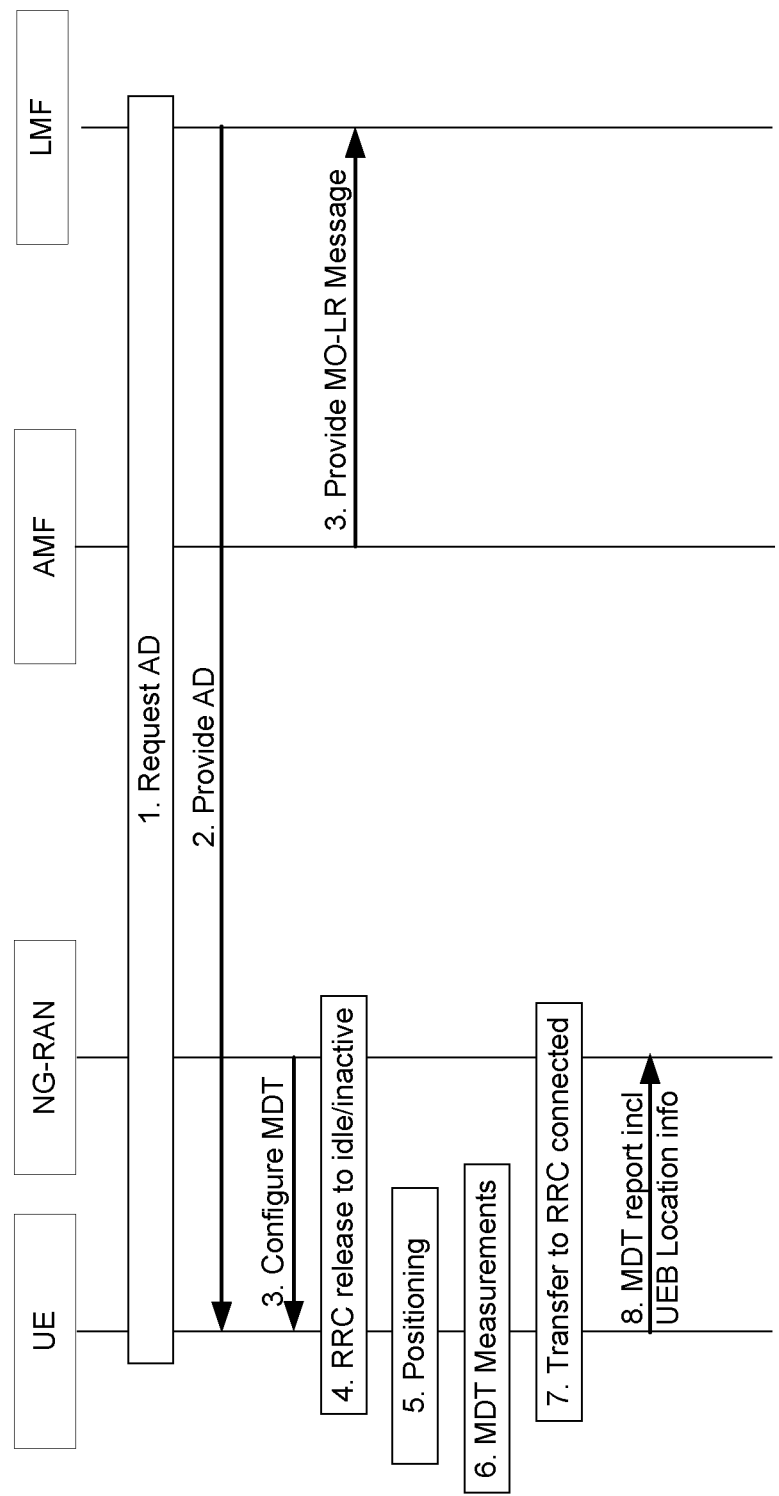
FIG. 20 is a call flow diagram for using UE-based positioning together with Minimization of Drive Tests (MDT) according to some embodiments.

In yet another embodiment, the UE stores the positioning information (positioning measurements, and/or positioning estimates, and/or other information related to the position of the device) in variables associated to logged minimization of drive test (MDT). In one mode of the embodiment, the serving cell indicates as part of a logged MDT configuration while in connected mode that the logged MDT shall include position information (location information) based on UE-based positioning comprising RAT dependent positioning methods if that has been configured via the location server. FIG. 20 illustrates the signaling of this embodiment. In particular, FIG. 20 shows UE-based positioning to be used together with MDT.

As shown in FIG. 20, in Step 1, the UE requests assistance data to support UE-based positioning via one of the discussed mechanisms. In Step 2, the location server, via one of the discussed mechanisms, provides assistance data to the UE for UE-based positioning. In Step 3, NG-RAN configures MDT for the UE. For immediate MDT, the UE will use the UE-based positioning results, perform MDT & measurements and go to step 8. For logged MDT, the UE will await being in idle or inactive before the MDT configuration is applicable. In Step 4, the UE is released to idle or inactive. In Step 5, the UE uses the provided assistance data for UE based positioning. In Step 6, the UE performs MDT measurements (note that steps 5 and 6 can be in alternate order, can be repeated, etc.). In Step 7, the UE transfers to connected mode. In Step 8, the UE reports MDT with UE location info.

In yet another embodiment, the capability indication of the UE is combined so that an indicated UE capability combines support for UE-based and UE-assisted. In one embodiment, the support for UE assisted is restricted to one or more causes. One example of such a cause is "network management" or "network maintenance" or "positioning validation" or similar, i.e. where the purpose is associated to network tuning and service improvements on the network side.

In an embodiment, the obtained result from the UE is used by the network to further determine the cell list for DL OTDOA UE based procedure. Further, the obtained RSTD, RSRP values can be used for fingerprinting (mapping RSRP values to Positioning vector/space co-ordinates)

Consider now additional details of some embodiments. The use case where DL OTDOA can be seen as beneficial are:
 a) Verifying that UE based GNSS location results are accurate
 b) Pedestrian or low-mobility Navigations in urban canyon
 c) Hybrid Solution combining GNSS results and NR RAT dependent results (less than 3 satellites available but dense NR deployment)

In LTE and NR, A-GNSS based positioning method has been already defined as UE based and standalone. TS 36.305 V15.2.0, stage2 functional specification of UE and EUTRAN. Vehicular outdoor navigation is one of the important use cases requiring high accuracy positioning. The cars are inbuilt with multiple sensors and have very high processing capacity. They are equipped with Global Positioning Systems (GPSs) and would be able to further receive real-time kinetic (RTK) Assistance Data (AD) from the Network. It is very relevant that for these use cases and for this sort of devices (cars) a UE based, or standalone, positioning method is realized.

Further, a RAT dependent UE based positioning method can augment the GNSS based solution. Accordingly, outdoor Vehicular Navigation where cars are the location consumer is a valid use case for UE based Positioning methods. GNSS based solution and DL OTDOA UE based solution could work in tandem.

In order to support UE based positioning method, the network needs to provide at least the below information:

Co-ordinates of cells (Antenna/TPs); and Real Time difference between cells. These are static information which are different than the varying satellite correction information. The UE based DL OTDOA positioning method would require the Network to transmit the transmission point (TP) co-ordinates which are sensitive information in some regions. Considering the below aspects, DL OTDOA is suitable for unicast rather than broadcast.

a) Broadcast is always re-occurring static overhead. Even with on-demand, to provide support to one UE the broadcast needs to be enabled.
b) Unicast already provides integrity protection and security mechanisms
c) Expensive Broadcast ciphering-based solution can be avoided if the information is unicast
d) Network can authenticate the UE and check its subscription and provide the Assistance data needed accordingly. So, NW has more visibility as who gets the sensitive information.
e) Moreover, DL OTDOA UE based Assistance data is static and to save NW energy and resources a unicast approach is more suitable.

Accordingly, DL OTDOA UE based Assistance Data are static and suitable for unicast rather than broadcast. Further, the network can have better visibility who obtains the sensitive information. It is proposed, then, that Rel-16 DL OTDOA UE based is supported via only unicast mechanism.

Figure 21:
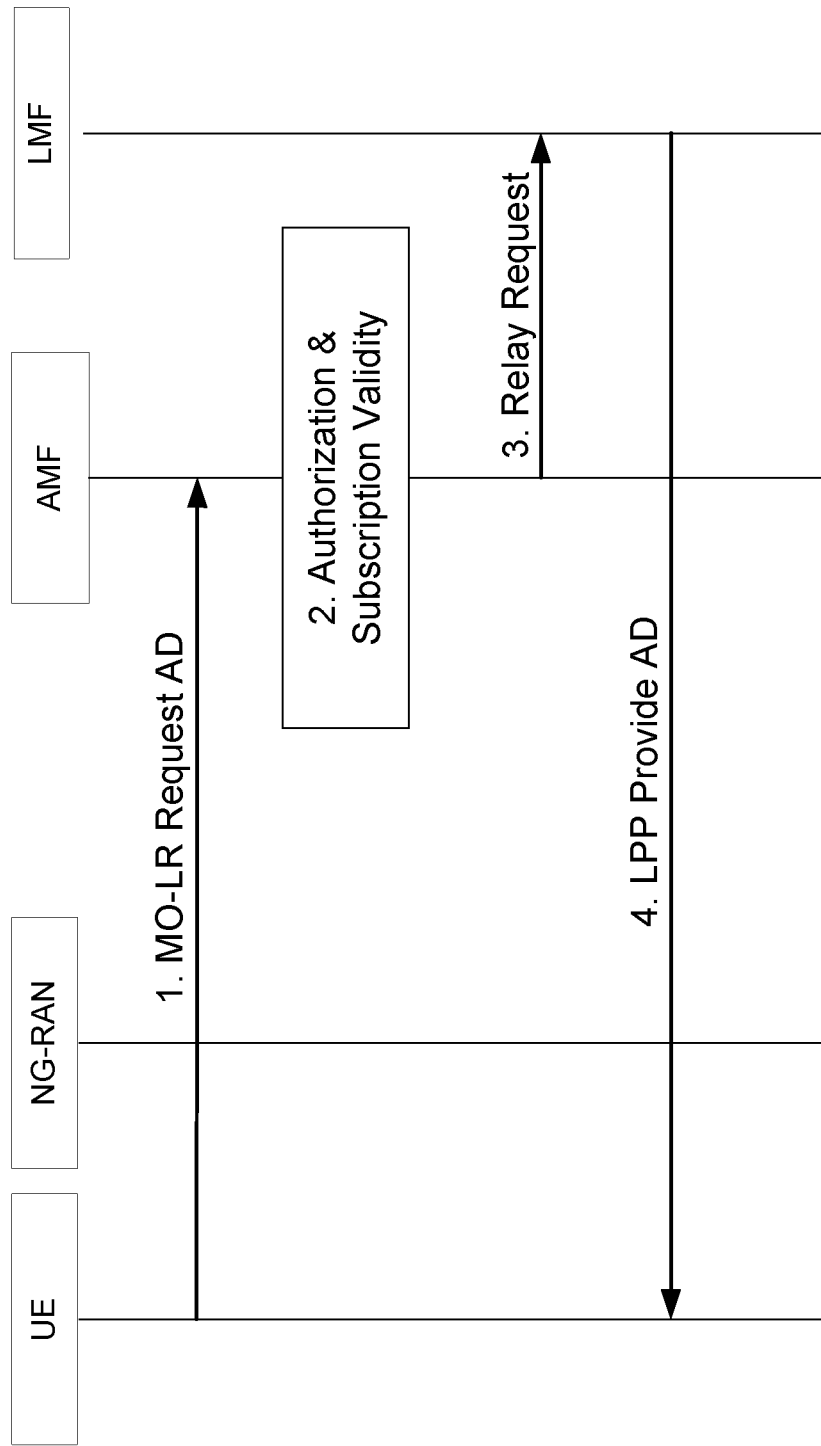
FIG. 21 is a block diagram of a framework to support a unicast based assistance data delivery solution for positioning according to some embodiments.

A simple framework to support a unicast based solution is depicted in FIG. 21. As shown, a UE using a mobile-originated location request (MO-LR) requests the DL OTDOA UE based positioning (Step 1). The Access and Mobility Function (AMF) authenticates and verifies the subscription (Step 2) and accordingly requests the Location Management Function (LMF) to prepare the assistance data (AD) (Step 3). The LMF prepares and provides the AD to the UE (Step 4).

Consider now aspects related to providing Measurements to the NW in UE based Mode positioning. Currently, there is a provision in the LTE Positioning Protocol (LPP) (3GPP TS 36.355) to provide a periodical report. However, this requires the UE to be in connected mode. The use cases where UE based positioning method is found useful is mainly for navigation purposes where the UE would also be using the GNSS solution. A UE can obtain DL OTDOA and some other A-GNSS like Almanac information via unicast as they are more suitable for unicast as mentioned above. These data are valid for a longer period of time. The UE after obtaining the necessary unicast data can go to idle mode and can obtain Precise Point Positioning (PPP) RTK (PPP-RTK) related information via broadcast. Thus, in idle mode it may not have the means to provide a periodical report. In such cases, a UE is required to store the measurement results offline and report to the NW when NW requests. It should also be possible that a UE can go to connected mode to ask the NW to verify that the results it obtained are correct. Therefore, the idle mode logging and UE to request to verify the result should be supported for UE based positioning method.

Figure 22:
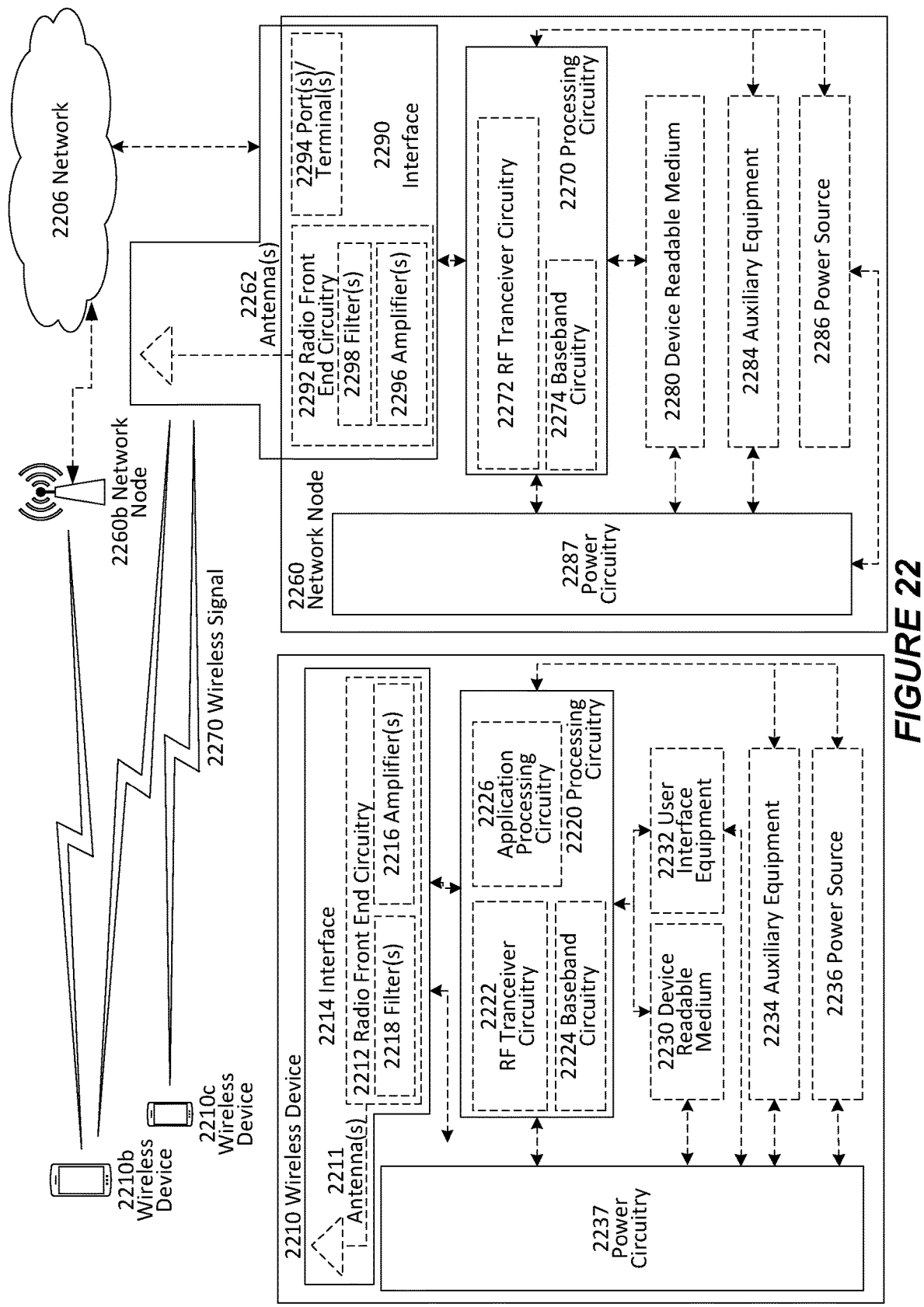
FIG. 22 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 22. For simplicity, the wireless network of FIG. 22 only depicts network 2206, network nodes 2260 and 2260b, and WDs 2210, 2210b, and 2210c. In practice, a wireless network may further include any additional elements suitable to support communication between wireless devices or between a wireless device and another communication device, such as a landline telephone, a service provider, or any other network node or end device. Of the illustrated components, network node 2260 and wireless device (WD) 2210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2260 and WD 2210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio.

Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 22, network node 2260 includes processing circuitry 2270, device readable medium 2280, interface 2290, auxiliary equipment 2284, power source 2286, power circuitry 2287, and antenna 2262. Although network node 2260 illustrated in the example wireless network of FIG. 22 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2260 are depicted as single boxes located within a larger box, or nested within multiple boxes, in practice, a network node may comprise multiple different physical components that make up a single illustrated component (e.g., device readable medium 2280 may comprise multiple separate hard drives as well as multiple RAM modules).

Similarly, network node 2260 may be composed of multiple physically separate components (e.g., a NodeB component and a RNC component, or a BTS component and a BSC component, etc.), which may each have their own respective components. In certain scenarios in which network node 2260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2260 may be configured to support multiple radio access technologies (RATs). In such embodiments, some components may be duplicated (e.g., separate device readable medium 2280 for the different RATs) and some components may be reused (e.g., the same antenna 2262 may be shared by the RATs). Network node 2260 may also include multiple sets of the various illustrated components for different wireless technologies integrated into network node 2260, such as, for example, GSM, WCDMA, LTE, NR, WiFi, or Bluetooth wireless technologies. These wireless technologies may be integrated into the same or different chip or set of chips and other components within network node 2260.

Processing circuitry 2270 is configured to perform any determining, calculating, or similar operations (e.g., certain obtaining operations) described herein as being provided by a network node. These operations performed by processing circuitry 2270 may include processing information obtained by processing circuitry 2270 by, for example, converting the obtained information into other information, comparing the obtained information or converted information to information stored in the network node, and/or performing one or more operations based on the obtained information or converted information, and as a result of said processing making a determination.

Processing circuitry 2270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2260 components, such as device readable medium 2280, network node 2260 functionality. For example, processing circuitry 2270 may execute instructions stored in device readable medium 2280 or in memory within processing circuitry 2270. Such functionality may include providing any of the various wireless features, functions, or benefits discussed herein. In some embodiments, processing circuitry 2270 may include a system on a chip (SOC).

In some embodiments, processing circuitry 2270 may include one or more of radio frequency (RF) transceiver circuitry 2272 and baseband processing circuitry 2274. In some embodiments, radio frequency (RF) transceiver circuitry 2272 and baseband processing circuitry 2274 may be on separate chips (or sets of chips), boards, or units, such as radio units and digital units. In alternative embodiments, part or all of RF transceiver circuitry 2272 and baseband processing circuitry 2274 may be on the same chip or set of chips, boards, or units In certain embodiments, some or all of the functionality described herein as being provided by a network node, base station, eNB or other such network device may be performed by processing circuitry 2270 executing instructions stored on device readable medium 2280 or memory within processing circuitry 2270. In alternative embodiments, some or all of the functionality may be provided by processing circuitry 2270 without executing instructions stored on a separate or discrete device readable medium, such as in a hard-wired manner. In any of those embodiments, whether executing instructions stored on a device readable storage medium or not, processing circuitry 2270 can be configured to perform the described functionality. The benefits provided by such functionality are not limited to processing circuitry 2270 alone or to other components of network node 2260, but are enjoyed by network node 2260 as a whole, and/or by end users and the wireless network generally.

Device readable medium 2280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2270. Device readable medium 2280 may store any suitable instructions, data or information, including a computer program, software, an application including one or more of logic, rules, code, tables, etc. and/or other instructions capable of being executed by processing circuitry 2270 and, utilized by network node 2260. Device readable medium 2280 may be used to store any calculations made by processing circuitry 2270 and/or any data received via interface 2290. In some embodiments, processing circuitry 2270 and device readable medium 2280 may be considered to be integrated.

Interface 2290 is used in the wired or wireless communication of signalling and/or data between network node 2260, network 2206, and/or WDs 2210. As illustrated, interface 2290 comprises port(s)/terminal(s) 2294 to send and receive data, for example to and from network 2206 over a wired connection. Interface 2290 also includes radio front end circuitry 2292 that may be coupled to, or in certain embodiments a part of, antenna 2262. Radio front end circuitry 2292 comprises filters 2298 and amplifiers 2296. Radio front end circuitry 2292 may be connected to antenna 2262 and processing circuitry 2270. Radio front end circuitry may be configured to condition signals communicated between antenna 2262 and processing circuitry 2270. Radio front end circuitry 2292 may receive digital data that is to be sent out to other network nodes or WDs via a wireless connection. Radio front end circuitry 2292 may convert the digital data into a radio signal having the appropriate channel and bandwidth parameters using a combination of filters 2298 and/or amplifiers 2296. The radio signal may then be transmitted via antenna 2262. Similarly, when receiving data, antenna 2262 may collect radio signals which are then converted into digital data by radio front end circuitry 2292. The digital data may be passed to processing circuitry 2270. In other embodiments, the interface may comprise different components and/or different combinations of components.

In certain alternative embodiments, network node 2260 may not include separate radio front end circuitry 2292, instead, processing circuitry 2270 may comprise radio front end circuitry and may be connected to antenna 2262 without separate radio front end circuitry 2292. Similarly, in some embodiments, all or some of RF transceiver circuitry 2272 may be considered a part of interface 2290. In still other embodiments, interface 2290 may include one or more ports or terminals 2294, radio front end circuitry 2292, and RF transceiver circuitry 2272, as part of a radio unit (not shown), and interface 2290 may communicate with baseband processing circuitry 2274, which is part of a digital unit (not shown).

Antenna 2262 may include one or more antennas, or antenna arrays, configured to send and/or receive wireless signals. Antenna 2262 may be coupled to radio front end circuitry 2290 and may be any type of antenna capable of transmitting and receiving data and/or signals wirelessly. In some embodiments, antenna 2262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2262 may be separate from network node 2260 and may be connectable to network node 2260 through an interface or port.

Antenna 2262, interface 2290, and/or processing circuitry 2270 may be configured to perform any receiving operations and/or certain obtaining operations described herein as being performed by a network node. Any information, data and/or signals may be received from a wireless device, another network node and/or any other network equipment. Similarly, antenna 2262, interface 2290, and/or processing circuitry 2270 may be configured to perform any transmitting operations described herein as being performed by a network node. Any information, data and/or signals may be transmitted to a wireless device, another network node and/or any other network equipment.

Power circuitry 2287 may comprise, or be coupled to, power management circuitry and is configured to supply the components of network node 2260 with power for performing the functionality described herein. Power circuitry 2287 may receive power from power source 2286. Power source 2286 and/or power circuitry 2287 may be configured to provide power to the various components of network node 2260 in a form suitable for the respective components (e.g., at a voltage and current level needed for each respective component). Power source 2286 may either be included in, or external to, power circuitry 2287 and/or network node 2260. For example, network node 2260 may be connectable to an external power source (e.g., an electricity outlet) via an input circuitry or interface such as an electrical cable, whereby the external power source supplies power to power circuitry 2287. As a further example, power source 2286 may comprise a source of power in the form of a battery or battery pack which is connected to, or integrated in, power circuitry 2287. The battery may provide backup power should the external power source fail. Other types of power sources, such as photovoltaic devices, may also be used.

Alternative embodiments of network node 2260 may include additional components beyond those shown in FIG. 22 that may be responsible for providing certain aspects of the network node's functionality, including any of the functionality described herein and/or any functionality necessary to support the subject matter described herein. For example, network node 2260 may include user interface equipment to allow input of information into network node 2260 and to allow output of information from network node 2260. This may allow a user to perform diagnostic, maintenance, repair, and other administrative functions for network node 2260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2210 includes antenna 2211, interface 2214, processing circuitry 2220, device readable medium 2230, user interface equipment 2232, auxiliary equipment 2234, power source 2236 and power circuitry 2237. WD 2210 may include multiple sets of one or more of the illustrated components for different wireless technologies supported by WD 2210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2210.

Antenna 2211 may include one or more antennas or antenna arrays, configured to send and/or receive wireless signals, and is connected to interface 2214. In certain alternative embodiments, antenna 2211 may be separate from WD 2210 and be connectable to WD 2210 through an interface or port. Antenna 2211, interface 2214, and/or processing circuitry 2220 may be configured to perform any receiving or transmitting operations described herein as being performed by a WD. Any information, data and/or signals may be received from a network node and/or another WD. In some embodiments, radio front end circuitry and/or antenna 2211 may be considered an interface.

As illustrated, interface 2214 comprises radio front end circuitry 2212 and antenna 2211. Radio front end circuitry 2212 comprise one or more filters 2218 and amplifiers 2216. Radio front end circuitry 2214 is connected to antenna 2211 and processing circuitry 2220, and is configured to condition signals communicated between antenna 2211 and processing circuitry 2220. Radio front end circuitry 2212 may be coupled to or a part of antenna 2211. In some embodiments, WD 2210 may not include separate radio front end circuitry 2212; rather, processing circuitry 2220 may comprise radio front end circuitry and may be connected to antenna 2211. Similarly, in some embodiments, some or all of RF transceiver circuitry 2222 may be considered a part of interface 2214. Radio front end circuitry 2212 may receive digital data that is to be sent out to other network nodes or WDs via a wireless connection. Radio front end circuitry 2212 may convert the digital data into a radio signal having the appropriate channel and bandwidth parameters using a combination of filters 2218 and/or amplifiers 2216. The radio signal may then be transmitted via antenna 2211. Similarly, when receiving data, antenna 2211 may collect radio signals which are then converted into digital data by radio front end circuitry 2212. The digital data may be passed to processing circuitry 2220. In other embodiments, the interface may comprise different components and/or different combinations of components.

Processing circuitry 2220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2210 components, such as device readable medium 2230, WD 2210 functionality. Such functionality may include providing any of the various wireless features or benefits discussed herein. For example, processing circuitry 2220 may execute instructions stored in device readable medium 2230 or in memory within processing circuitry 2220 to provide the functionality disclosed herein.

As illustrated, processing circuitry 2220 includes one or more of RF transceiver circuitry 2222, baseband processing circuitry 2224, and application processing circuitry 2226. In other embodiments, the processing circuitry may comprise different components and/or different combinations of components. In certain embodiments processing circuitry 2220 of WD 2210 may comprise a SOC. In some embodiments, RF transceiver circuitry 2222, baseband processing circuitry 2224, and application processing circuitry 2226 may be on separate chips or sets of chips. In alternative embodiments, part or all of baseband processing circuitry 2224 and application processing circuitry 2226 may be combined into one chip or set of chips, and RF transceiver circuitry 2222 may be on a separate chip or set of chips. In still alternative embodiments, part or all of RF transceiver circuitry 2222 and baseband processing circuitry 2224 may be on the same chip or set of chips, and application processing circuitry 2226 may be on a separate chip or set of chips. In yet other alternative embodiments, part or all of RF transceiver circuitry 2222, baseband processing circuitry 2224, and application processing circuitry 2226 may be combined in the same chip or set of chips. In some embodiments, RF transceiver circuitry 2222 may be a part of interface 2214. RF transceiver circuitry 2222 may condition RF signals for processing circuitry 2220.

In certain embodiments, some or all of the functionality described herein as being performed by a WD may be provided by processing circuitry 2220 executing instructions stored on device readable medium 2230, which in certain embodiments may be a computer-readable storage medium. In alternative embodiments, some or all of the functionality may be provided by processing circuitry 2220 without executing instructions stored on a separate or discrete device readable storage medium, such as in a hard-wired manner. In any of those particular embodiments, whether executing instructions stored on a device readable storage medium or not, processing circuitry 2220 can be configured to perform the described functionality. The benefits provided by such functionality are not limited to processing circuitry 2220 alone or to other components of WD 2210, but are enjoyed by WD 2210 as a whole, and/or by end users and the wireless network generally.

Processing circuitry 2220 may be configured to perform any determining, calculating, or similar operations (e.g., certain obtaining operations) described herein as being performed by a WD. These operations, as performed by processing circuitry 2220, may include processing information obtained by processing circuitry 2220 by, for example, converting the obtained information into other information, comparing the obtained information or converted information to information stored by WD 2210, and/or performing one or more operations based on the obtained information or converted information, and as a result of said processing making a determination.

Device readable medium 2230 may be operable to store a computer program, software, an application including one or more of logic, rules, code, tables, etc. and/or other instructions capable of being executed by processing circuitry 2220. Device readable medium 2230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2220. In some embodiments, processing circuitry 2220 and device readable medium 2230 may be considered to be integrated.

User interface equipment 2232 may provide components that allow for a human user to interact with WD 2210. Such interaction may be of many forms, such as visual, audial, tactile, etc. User interface equipment 2232 may be operable to produce output to the user and to allow the user to provide input to WD 2210. The type of interaction may vary depending on the type of user interface equipment 2232 installed in WD 2210. For example, if WD 2210 is a smart phone, the interaction may be via a touch screen; if WD 2210 is a smart meter, the interaction may be through a screen that provides usage (e.g., the number of gallons used) or a speaker that provides an audible alert (e.g., if smoke is detected). User interface equipment 2232 may include input interfaces, devices and circuits, and output interfaces, devices and circuits. User interface equipment 2232 is configured to allow input of information into WD 2210, and is connected to processing circuitry 2220 to allow processing circuitry 2220 to process the input information. User interface equipment 2232 may include, for example, a microphone, a proximity or other sensor, keys/buttons, a touch display, one or more cameras, a USB port, or other input circuitry. User interface equipment 2232 is also configured to allow output of information from WD 2210, and to allow processing circuitry 2220 to output information from WD 2210. User interface equipment 2232 may include, for example, a speaker, a display, vibrating circuitry, a USB port, a headphone interface, or other output circuitry. Using one or more input and output interfaces, devices, and circuits, of user interface equipment 2232, WD 2210 may communicate with end users and/or the wireless network, and allow them to benefit from the functionality described herein.

Auxiliary equipment 2234 is operable to provide more specific functionality which may not be generally performed by WDs. This may comprise specialized sensors for doing measurements for various purposes, interfaces for additional types of communication such as wired communications etc. The inclusion and type of components of auxiliary equipment 2234 may vary depending on the embodiment and/or scenario.

Power source 2236 may, in some embodiments, be in the form of a battery or battery pack. Other types of power sources, such as an external power source (e.g., an electricity outlet), photovoltaic devices or power cells, may also be used. WD 2210 may further comprise power circuitry 2237 for delivering power from power source 2236 to the various parts of WD 2210 which need power from power source 2236 to carry out any functionality described or indicated herein. Power circuitry 2237 may in certain embodiments comprise power management circuitry. Power circuitry 2237 may additionally or alternatively be operable to receive power from an external power source; in which case WD 2210 may be connectable to the external power source (such as an electricity outlet) via input circuitry or an interface such as an electrical power cable. Power circuitry 2237 may also in certain embodiments be operable to deliver power from an external power source to power source 2236. This may be, for example, for the charging of power source 2236. Power circuitry 2237 may perform any formatting, converting, or other modification to the power from power source 2236 to make the power suitable for the respective components of WD 2210 to which power is supplied.

Figure 23:
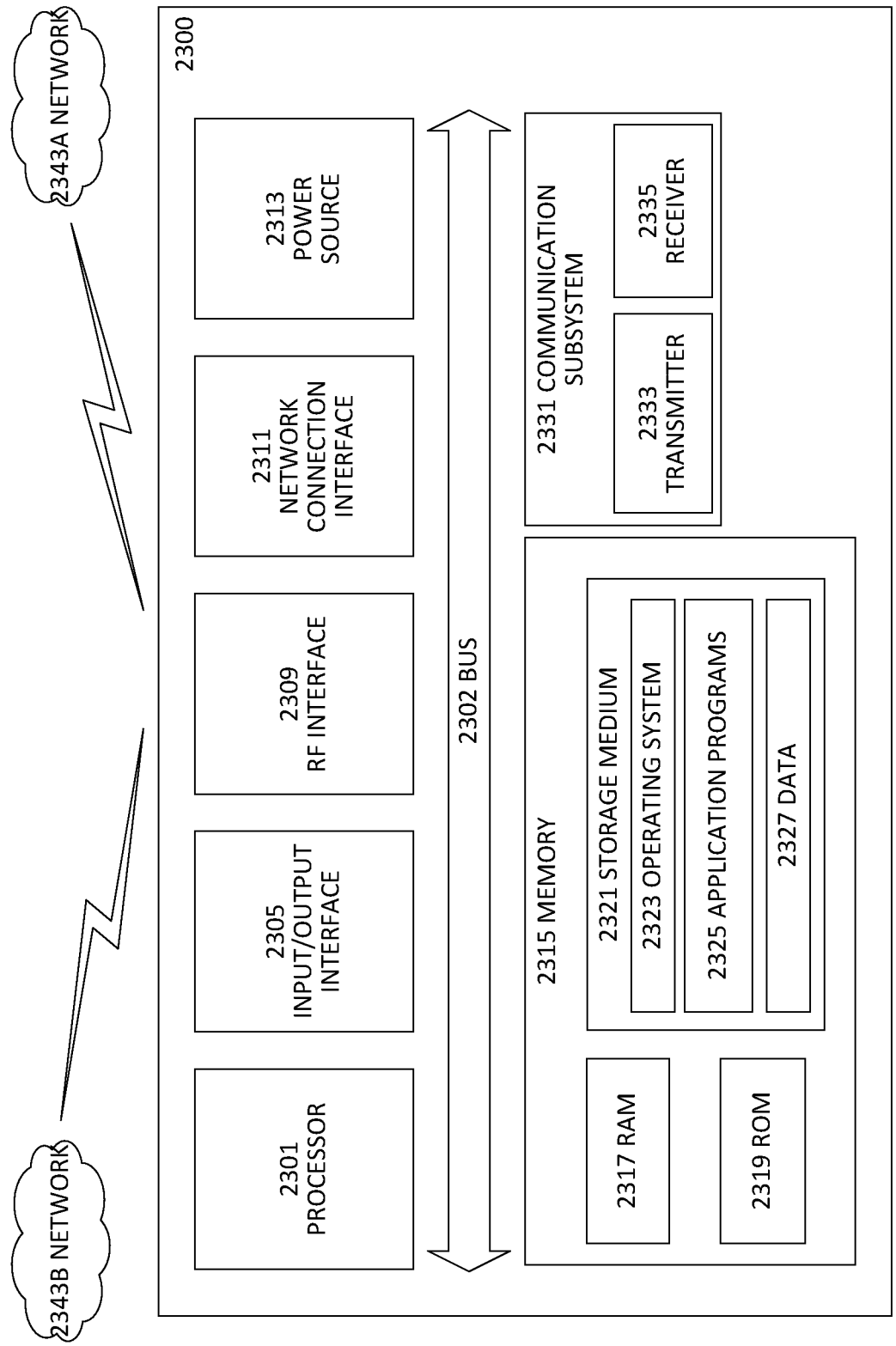
FIG. 23 is a block diagram of a user equipment according to some embodiments.

FIG. 23 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 23200 may be any UE identified by the $3^{rd}$ Generation Partnership Project (3GPP), including a NB-IoT UE, a machine type communication (MTC) UE, and/or an enhanced MTC (eMTC) UE. UE 2300, as illustrated in FIG. 23, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 23 is a UE, the components discussed herein are equally applicable to a WD, and vice-versa.

In FIG. 23, UE 2300 includes processing circuitry 2301 that is operatively coupled to input/output interface 2305, radio frequency (RF) interface 2309, network connection interface 2311, memory 2315 including random access memory (RAM) 2317, read-only memory (ROM) 2319, and storage medium 2321 or the like, communication subsystem 2331, power source 2333, and/or any other component, or any combination thereof. Storage medium 2321 includes operating system 2323, application program 2325, and data 2327. In other embodiments, storage medium 2321 may include other similar types of information. Certain UEs may utilize all of the components shown in FIG. 23, or only a subset of the components. The level of integration between the components may vary from one UE to another UE. Further, certain UEs may contain multiple instances of a component, such as multiple processors, memories, transceivers, transmitters, receivers, etc.

In FIG. 23, processing circuitry 2301 may be configured to process computer instructions and data. Processing circuitry 2301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2301 may include two central processing units (CPUs). Data may be information in a form suitable for use by a computer.

In the depicted embodiment, input/output interface 2305 may be configured to provide a communication interface to an input device, output device, or input and output device. UE 2300 may be configured to use an output device via input/output interface 2305. An output device may use the same type of interface port as an input device. For example, a USB port may be used to provide input to and output from UE 2300. The output device may be a speaker, a sound card, a video card, a display, a monitor, a printer, an actuator, an emitter, a smartcard, another output device, or any combination thereof. UE 2300 may be configured to use an input device via input/output interface 2305 to allow a user to capture information into UE 2300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 23, RF interface 2309 may be configured to provide a communication interface to RF components such as a transmitter, a receiver, and an antenna. Network connection interface 2311 may be configured to provide a communication interface to network 2343*a*. Network 2343*a* may encompass wired and/or wireless networks such as a local-area network (LAN), a wide-area network (WAN), a computer network, a wireless network, a telecommunications network, another like network or any combination thereof. For example, network 2343*a* may comprise a Wi-Fi network. Network connection interface 2311 may be configured to include a receiver and a transmitter interface used to communicate with one or more other devices over a communication network according to one or more communication protocols, such as Ethernet, TCP/IP, SONET, ATM, or the like. Network connection interface 2311 may implement receiver and transmitter functionality appropriate to the communication network links (e.g., optical, electrical, and the like). The transmitter and receiver functions may share circuit components, software or firmware, or alternatively may be implemented separately.

RAM 2317 may be configured to interface via bus 2302 to processing circuitry 2301 to provide storage or caching of data or computer instructions during the execution of software programs such as the operating system, application programs, and device drivers. ROM 2319 may be configured to provide computer instructions or data to processing circuitry 2301. For example, ROM 2319 may be configured to store invariant low-level system code or data for basic system functions such as basic input and output (I/O), startup, or reception of keystrokes from a keyboard that are stored in a non-volatile memory. Storage medium 2321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2321 may be configured to include operating system 2323, application program 2325 such as a web browser application, a widget or gadget engine or another application, and data file 2327. Storage medium 2321 may store, for use by UE 2300, any of a variety of various operating systems or combinations of operating systems.

Storage medium 2321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2321 may allow UE 2300 to access computer-executable instructions, application programs or the like, stored on transitory or non-transitory memory media, to off-load data, or to upload data. An article of manufacture, such as one utilizing a communication system may be tangibly embodied in storage medium 2321, which may comprise a device readable medium.

In FIG. 23, processing circuitry 2301 may be configured to communicate with network 2343*b* using communication subsystem 2331. Network 2343*a* and network 2343*b* may be the same network or networks or different network or networks. Communication subsystem 2331 may be configured to include one or more transceivers used to communicate with network 2343*b*. For example, communication subsystem 2331 may be configured to include one or more transceivers used to communicate with one or more remote transceivers of another device capable of wireless communication such as another WD, UE, or base station of a radio access network (RAN) according to one or more communication protocols, such as IEEE 802.23, CDMA, WCDMA, GSM, LTE, UTRAN, WiMax, or the like. Each transceiver may include transmitter 2333 and/or receiver 2335 to implement transmitter or receiver functionality, respectively, appropriate to the RAN links (e.g., frequency allocations and the like). Further, transmitter 2333 and receiver 2335 of each transceiver may share circuit components, software or firmware, or alternatively may be implemented separately.

In the illustrated embodiment, the communication functions of communication subsystem 2331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2331 may include cellular communication, Wi-Fi communication, Bluetooth communication, and GPS communication. Network 2343*b* may encompass wired and/or wireless networks such as a local-area network (LAN), a wide-area network (WAN), a computer network, a wireless network, a telecommunications network, another like network or any combination thereof. For example, network 2343*b* may be a cellular network, a Wi-Fi network, and/or a near-field network. Power source 2313 may be configured to provide alternating current (AC) or direct current (DC) power to components of UE 2300.

The features, benefits and/or functions described herein may be implemented in one of the components of UE 2300 or partitioned across multiple components of UE 2300. Further, the features, benefits, and/or functions described herein may be implemented in any combination of hardware, software or firmware. In one example, communication subsystem 2331 may be configured to include any of the components described herein. Further, processing circuitry 2301 may be configured to communicate with any of such components over bus 2302. In another example, any of such components may be represented by program instructions stored in memory that when executed by processing circuitry 2301 perform the corresponding functions described herein. In another example, the functionality of any of such components may be partitioned between processing circuitry 2301 and communication subsystem 2331. In another example, the non-computationally intensive functions of any of such components may be implemented in software or firmware and the computationally intensive functions may be implemented in hardware.

Figure 24:
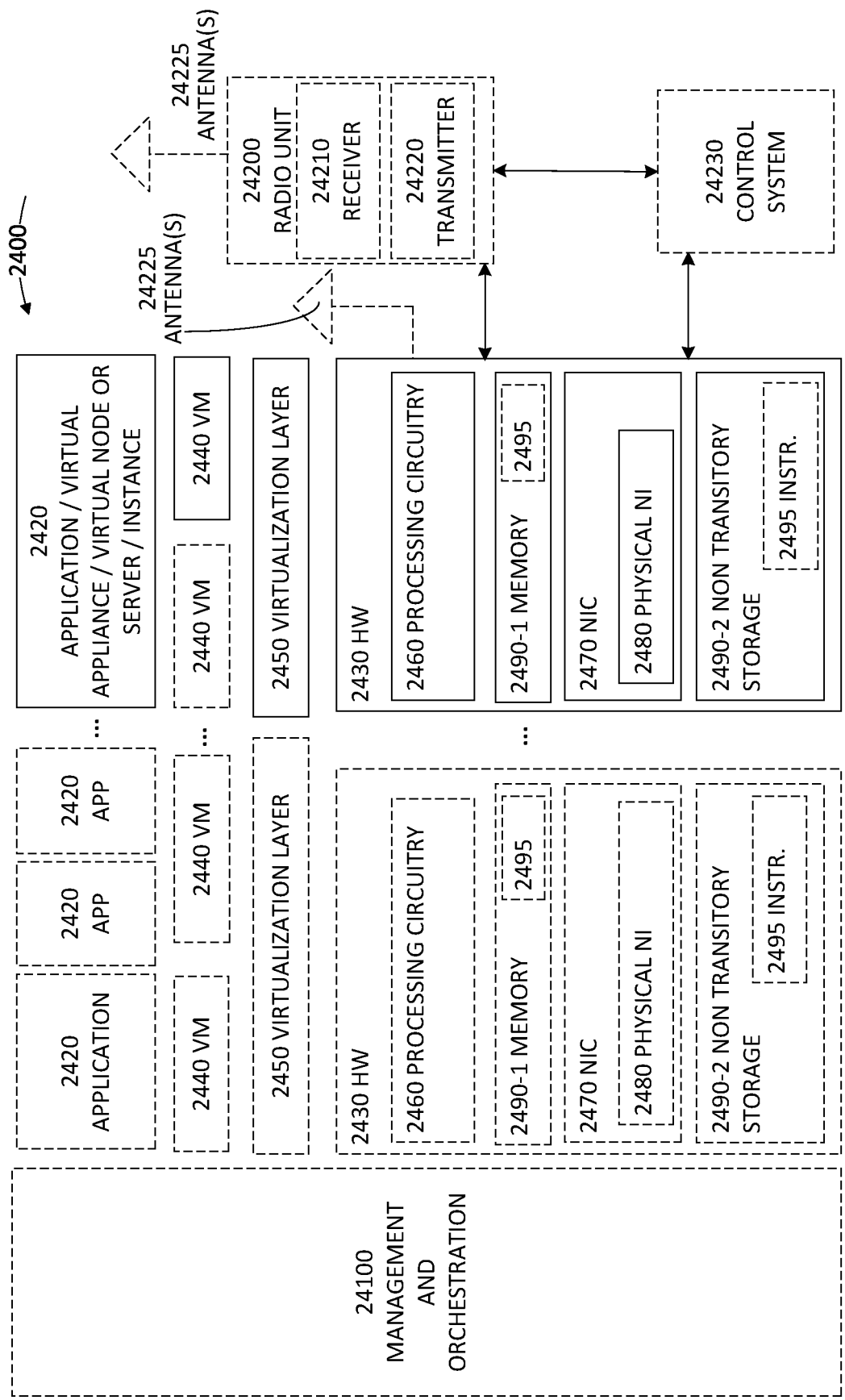
FIG. 24 is a block diagram of a virtualization environment according to some embodiments.

FIG. 24 is a schematic block diagram illustrating a virtualization environment 2400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2400 hosted by one or more of hardware nodes 2430. Further, in embodiments in which the virtual node is not a radio access node or does not require radio connectivity (e.g., a core network node), then the network node may be entirely virtualized.

The functions may be implemented by one or more applications 2420 (which may alternatively be called software instances, virtual appliances, network functions, virtual nodes, virtual network functions, etc.) operative to implement some of the features, functions, and/or benefits of some of the embodiments disclosed herein. Applications 2420 are run in virtualization environment 2400 which provides hardware 2430 comprising processing circuitry 2460 and memory 2490. Memory 2490 contains instructions 2495 executable by processing circuitry 2460 whereby application 2420 is operative to provide one or more of the features, benefits, and/or functions disclosed herein.

Virtualization environment 2400, comprises general-purpose or special-purpose network hardware devices 2430 comprising a set of one or more processors or processing circuitry 2460, which may be commercial off-the-shelf (COTS) processors, dedicated Application Specific Integrated Circuits (ASICs), or any other type of processing circuitry including digital or analog hardware components or special purpose processors. Each hardware device may comprise memory 2490-1 which may be non-persistent memory for temporarily storing instructions 2495 or software executed by processing circuitry 2460. Each hardware device may comprise one or more network interface controllers (NICs) 2470, also known as network interface cards, which include physical network interface 2480. Each hardware device may also include non-transitory, persistent, machine-readable storage media 2490-2 having stored therein software 2495 and/or instructions executable by processing circuitry 2460. Software 2495 may include any type of software including software for instantiating one or more virtualization layers 2450 (also referred to as hypervisors), software to execute virtual machines 2440 as well as software allowing it to execute functions, features and/or benefits described in relation with some embodiments described herein.

Virtual machines 2440, comprise virtual processing, virtual memory, virtual networking or interface and virtual storage, and may be run by a corresponding virtualization layer 2450 or hypervisor. Different embodiments of the instance of virtual appliance 2420 may be implemented on one or more of virtual machines 2440, and the implementations may be made in different ways.

During operation, processing circuitry 2460 executes software 2495 to instantiate the hypervisor or virtualization layer 2450, which may sometimes be referred to as a virtual machine monitor (VMM). Virtualization layer 2450 may present a virtual operating platform that appears like networking hardware to virtual machine 2440.

As shown in FIG. 24, hardware 2430 may be a standalone network node with generic or specific components. Hardware 2430 may comprise antenna 24225 and may implement some functions via virtualization. Alternatively, hardware 2430 may be part of a larger cluster of hardware (e.g. such as in a data center or customer premise equipment (CPE)) where many hardware nodes work together and are managed via management and orchestration (MANO) 24100, which, among others, oversees lifecycle management of applications 2420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2440 may be a software implementation of a physical machine that runs programs as if they were executing on a physical, non-virtualized machine. Each of virtual machines 2440, and that part of hardware 2430 that executes that virtual machine, be it hardware dedicated to that virtual machine and/or hardware shared by that virtual machine with others of the virtual machines 2440, forms a separate virtual network elements (VNE).

Still in the context of NFV, Virtual Network Function (VNF) is responsible for handling specific network functions that run in one or more virtual machines 2440 on top of hardware networking infrastructure 2430 and corresponds to application 2420 in FIG. 24.

In some embodiments, one or more radio units 24200 that each include one or more transmitters 24220 and one or more receivers 24210 may be coupled to one or more antennas 24225. Radio units 24200 may communicate directly with hardware nodes 2430 via one or more appropriate network interfaces and may be used in combination with the virtual components to provide a virtual node with radio capabilities, such as a radio access node or a base station.

In some embodiments, some signalling can be effected with the use of control system 24230 which may alternatively be used for communication between the hardware nodes 2430 and radio units 24200.

Figure 25:
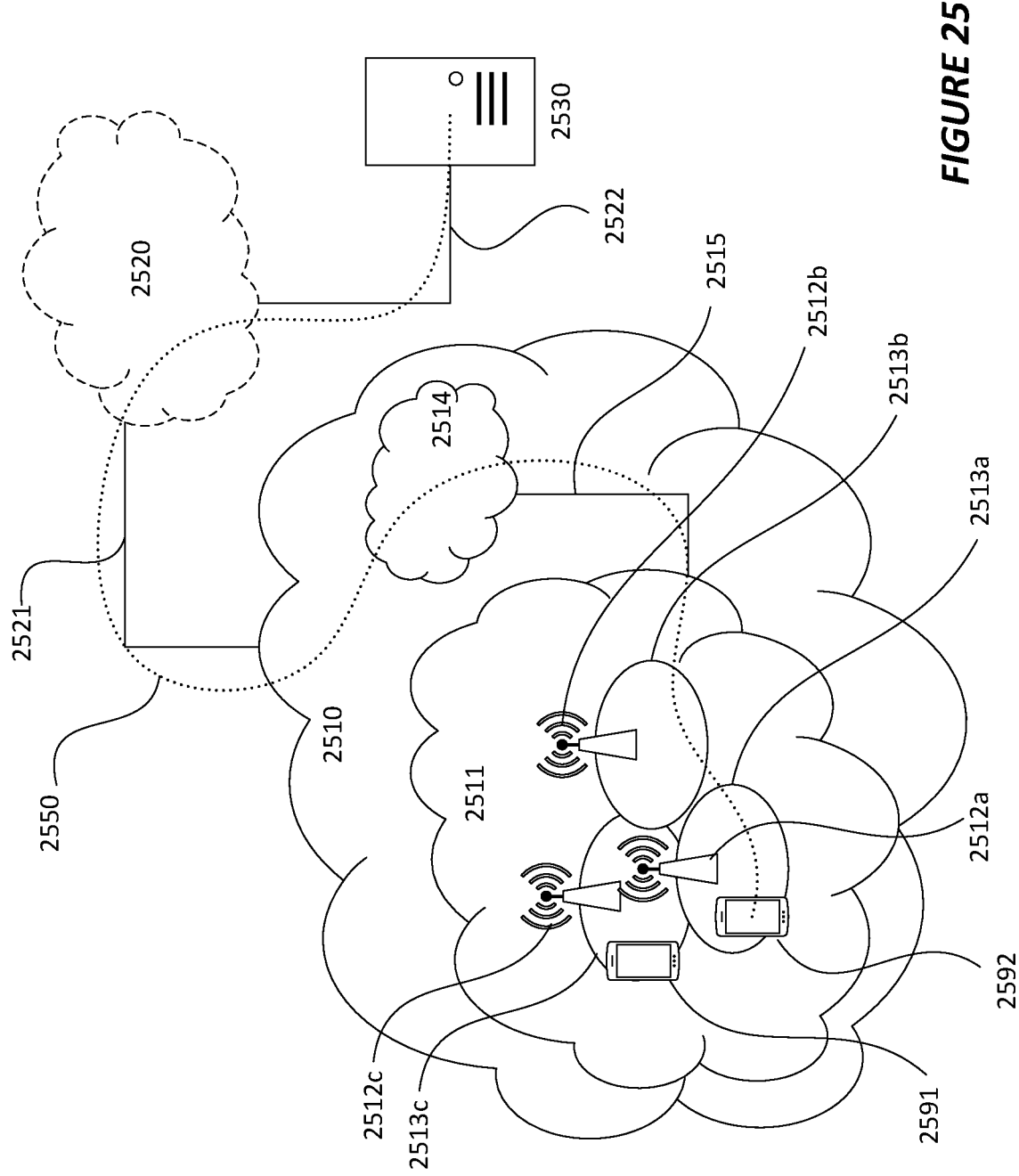
FIG. 25 is a block diagram of a communication network with a host computer according to some embodiments.

FIG. 25 illustrates a telecommunication network connected via an intermediate network to a host computer in accordance with some embodiments. In particular, with reference to FIG. 25, in accordance with an embodiment, a communication system includes telecommunication network 2510, such as a 3GPP-type cellular network, which comprises access network 2511, such as a radio access network, and core network 2514. Access network 2511 comprises a plurality of base stations 2512a, 2512b, 2512c, such as NBs, eNBs, gNBs or other types of wireless access points, each defining a corresponding coverage area 2513a, 2513b, 2513c. Each base station 2512a, 2512b, 2512c is connectable to core network 2514 over a wired or wireless connection 2515. A first UE 2591 located in coverage area 2513c is configured to wirelessly connect to, or be paged by, the corresponding base station 2512c. A second UE 2592 in coverage area 2513a is wirelessly connectable to the corresponding base station 2512a. While a plurality of UEs 2591, 2592 are illustrated in this example, the disclosed embodiments are equally applicable to a situation where a sole UE is in the coverage area or where a sole UE is connecting to the corresponding base station 2512.

Telecommunication network 2510 is itself connected to host computer 2530, which may be embodied in the hardware and/or software of a standalone server, a cloud-implemented server, a distributed server or as processing resources in a server farm. Host computer 2530 may be under the ownership or control of a service provider, or may be operated by the service provider or on behalf of the service provider. Connections 2521 and 2522 between telecommunication network 2510 and host computer 2530 may extend directly from core network 2514 to host computer 2530 or may go via an optional intermediate network 2520. Intermediate network 2520 may be one of, or a combination of more than one of, a public, private or hosted network; intermediate network 2520, if any, may be a backbone network or the Internet; in particular, intermediate network 2520 may comprise two or more sub-networks (not shown).

The communication system of FIG. 25 as a whole enables connectivity between the connected UEs 2591, 2592 and host computer 2530. The connectivity may be described as an over-the-top (OTT) connection 2550. Host computer 2530 and the connected UEs 2591, 2592 are configured to communicate data and/or signaling via OTT connection 2550, using access network 2511, core network 2514, any intermediate network 2520 and possible further infrastructure (not shown) as intermediaries. OTT connection 2550 may be transparent in the sense that the participating communication devices through which OTT connection 2550 passes are unaware of routing of uplink and downlink communications. For example, base station 2512 may not or need not be informed about the past routing of an incoming downlink communication with data originating from host computer 2530 to be forwarded (e.g., handed over) to a connected UE 2591. Similarly, base station 2512 need not be aware of the future routing of an outgoing uplink communication originating from the UE 2591 towards the host computer 2530.

Figure 26:
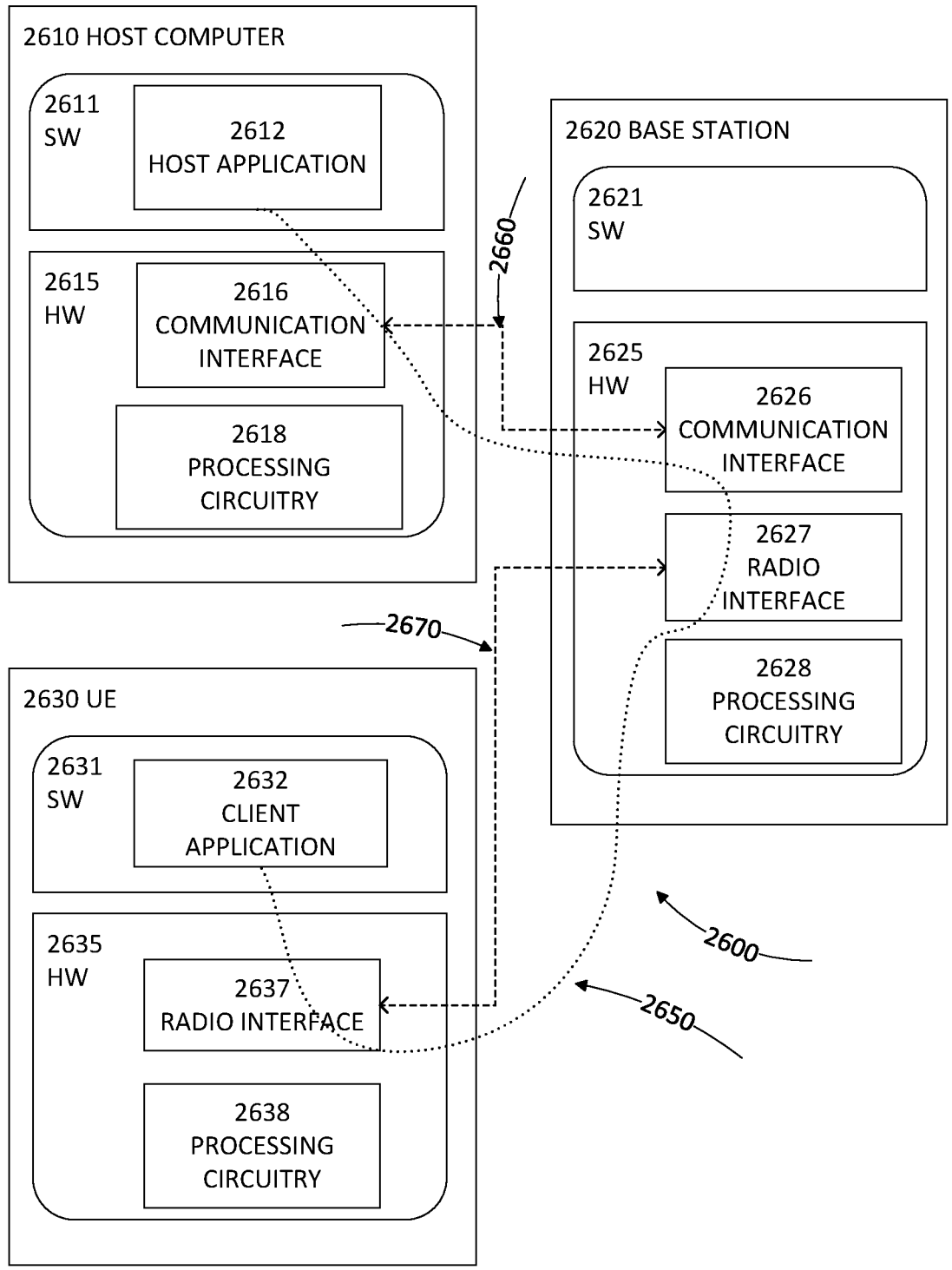
FIG. 26 is a block diagram of a host computer according to some embodiments.

Example implementations, in accordance with an embodiment, of the UE, base station and host computer discussed in the preceding paragraphs will now be described with reference to FIG. 26. FIG. 26 illustrates host computer communicating via a base station with a user equipment over a partially wireless connection in accordance with some embodiments In communication system 2600, host computer 2610 comprises hardware 2615 including communication interface 2616 configured to set up and maintain a wired or wireless connection with an interface of a different communication device of communication system 2600. Host computer 2610 further comprises processing circuitry 2618, which may have storage and/or processing capabilities. In particular, processing circuitry 2618 may comprise one or more programmable processors, application-specific integrated circuits, field programmable gate arrays or combinations of these (not shown) adapted to execute instructions. Host computer 2610 further comprises software 2611, which is stored in or accessible by host computer 2610 and executable by processing circuitry 2618. Software 2611 includes host application 2612. Host application 2612 may be operable to provide a service to a remote user, such as UE 2630 connecting via OTT connection 2650 terminating at UE 2630 and host computer 2610. In providing the service to the remote user, host application 2612 may provide user data which is transmitted using OTT connection 2650.

Communication system 2600 further includes base station 2620 provided in a telecommunication system and comprising hardware 2625 enabling it to communicate with host computer 2610 and with UE 2630. Hardware 2625 may include communication interface 2626 for setting up and maintaining a wired or wireless connection with an interface of a different communication device of communication system 2600, as well as radio interface 2627 for setting up and maintaining at least wireless connection 2670 with UE 2630 located in a coverage area (not shown in FIG. 26) served by base station 2620. Communication interface 2626 may be configured to facilitate connection 2660 to host computer 2610. Connection 2660 may be direct or it may pass through a core network (not shown in FIG. 26) of the telecommunication system and/or through one or more intermediate networks outside the telecommunication system. In the embodiment shown, hardware 2625 of base station 2620 further includes processing circuitry 2628, which may comprise one or more programmable processors, application-specific integrated circuits, field programmable gate arrays or combinations of these (not shown) adapted to execute instructions. Base station 2620 further has software 2621 stored internally or accessible via an external connection.

Communication system 2600 further includes UE 2630 already referred to. Its hardware 2635 may include radio interface 2637 configured to set up and maintain wireless connection 2670 with a base station serving a coverage area in which UE 2630 is currently located. Hardware 2635 of UE 2630 further includes processing circuitry 2638, which may comprise one or more programmable processors, application-specific integrated circuits, field programmable gate arrays or combinations of these (not shown) adapted to execute instructions. UE 2630 further comprises software 2631, which is stored in or accessible by UE 2630 and executable by processing circuitry 2638. Software 2631 includes client application 2632. Client application 2632 may be operable to provide a service to a human or non-human user via UE 2630, with the support of host computer 2610. In host computer 2610, an executing host application 2612 may communicate with the executing client application 2632 via OTT connection 2650 terminating at UE 2630 and host computer 2610. In providing the service to the user, client application 2632 may receive request data from host application 2612 and provide user data in response to the request data. OTT connection 2650 may transfer both the request data and the user data. Client application 2632 may interact with the user to generate the user data that it provides.

It is noted that host computer 2610, base station 2620 and UE 2630 illustrated in FIG. 26 may be similar or identical to host computer 2530, one of base stations 2512a, 2512b, 2512c and one of UEs 2591, 2592 of FIG. 25, respectively. This is to say, the inner workings of these entities may be as shown in FIG. 26 and independently, the surrounding network topology may be that of FIG. 25.

In FIG. 26, OTT connection 2650 has been drawn abstractly to illustrate the communication between host computer 2610 and UE 2630 via base station 2620, without explicit reference to any intermediary devices and the precise routing of messages via these devices. Network infrastructure may determine the routing, which it may be configured to hide from UE 2630 or from the service provider operating host computer 2610, or both. While OTT connection 2650 is active, the network infrastructure may further take decisions by which it dynamically changes the routing (e.g., on the basis of load balancing consideration or reconfiguration of the network).

Wireless connection 2670 between UE 2630 and base station 2620 is in accordance with the teachings of the embodiments described throughout this disclosure. One or more of the various embodiments improve the performance of OTT services provided to UE 2630 using OTT connection 2650, in which wireless connection 2670 forms the last segment.

A measurement procedure may be provided for the purpose of monitoring data rate, latency and other factors on which the one or more embodiments improve. There may further be an optional network functionality for reconfiguring OTT connection 2650 between host computer 2610 and UE 2630, in response to variations in the measurement results. The measurement procedure and/or the network functionality for reconfiguring OTT connection 2650 may be implemented in software 2611 and hardware 2615 of host computer 2610 or in software 2631 and hardware 2635 of UE 2630, or both. In embodiments, sensors (not shown) may be deployed in or in association with communication devices through which OTT connection 2650 passes; the sensors may participate in the measurement procedure by supplying values of the monitored quantities exemplified above, or supplying values of other physical quantities from which software 2611, 2631 may compute or estimate the monitored quantities. The reconfiguring of OTT connection 2650 may include message format, retransmission settings, preferred routing etc.; the reconfiguring need not affect base station 2620, and it may be unknown or imperceptible to base station 2620. Such procedures and functionalities may be known and practiced in the art. In certain embodiments, measurements may involve proprietary UE signaling facilitating host computer 2610's measurements of throughput, propagation times, latency and the like. The measurements may be implemented in that software 2611 and 2631 causes messages to be transmitted, in particular empty or 'dummy' messages, using OTT connection 2650 while it monitors propagation times, errors etc.

Figure 27:
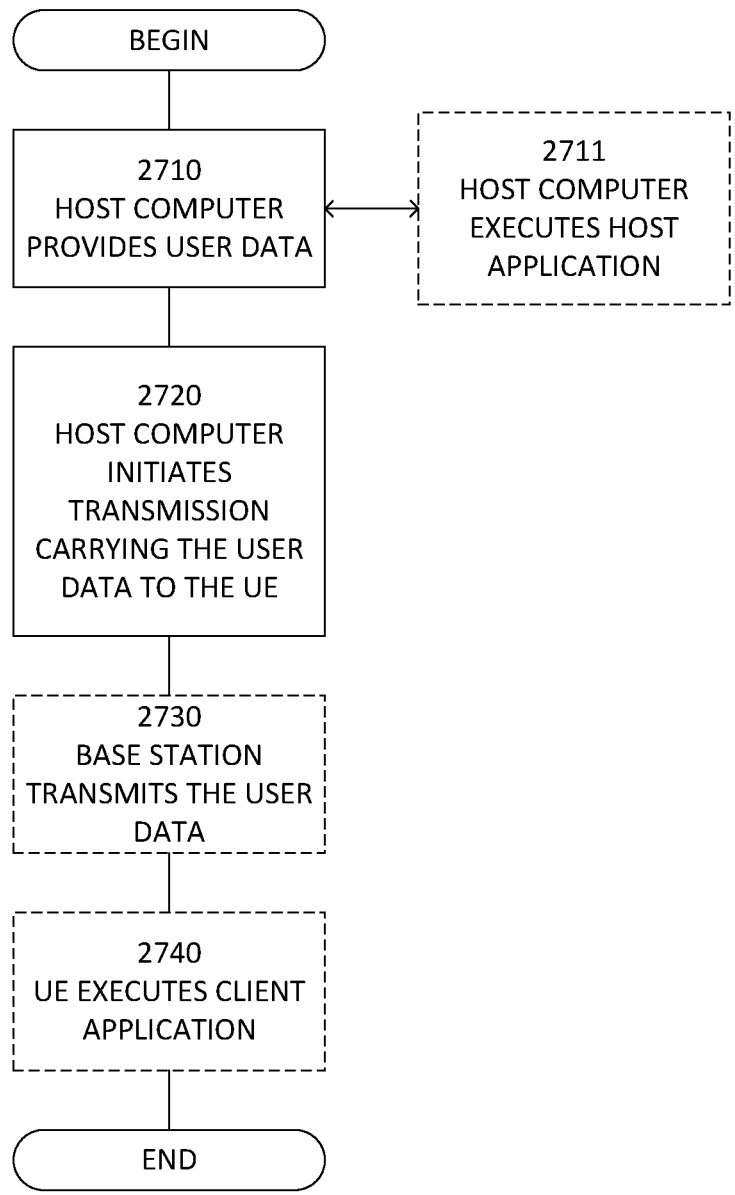
FIG. 27 is a flowchart illustrating a method implemented in a communication system, in accordance with one embodiment.

FIG. 27 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 27 will be included in this section. In step 2710, the host computer provides user data. In substep 2711 (which may be optional) of step 2710, the host computer provides the user data by executing a host application. In step 2720, the host computer initiates a transmission carrying the user data to the UE. In step 2730 (which may be optional), the base station transmits to the UE the user data which was carried in the transmission that the host computer initiated, in accordance with the teachings of the embodiments described throughout this disclosure. In step 2740 (which may also be optional), the UE executes a client application associated with the host application executed by the host computer.

Figure 28:
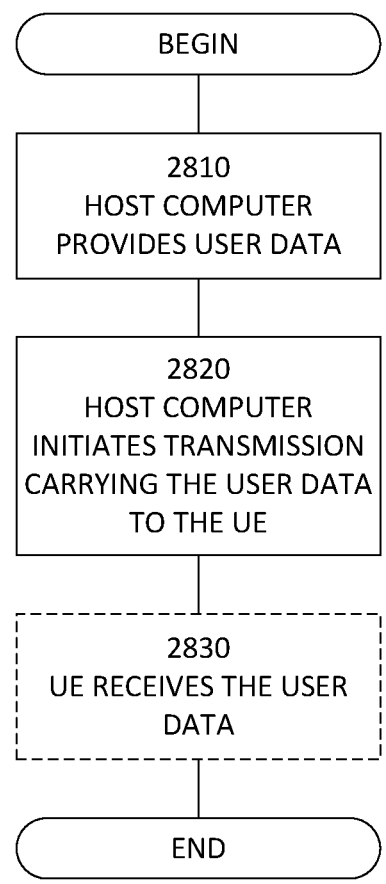
FIG. 28 is a flowchart illustrating a method implemented in a communication system, in accordance with one embodiment.

FIG. 28 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 28 will be included in this section. In step 2810 of the method, the host computer provides user data. In an optional substep (not shown) the host computer provides the user data by executing a host application. In step 2820, the host computer initiates a transmission carrying the user data to the UE. The transmission may pass via the base station, in accordance with the teachings of the embodiments described throughout this disclosure. In step 2830 (which may be optional), the UE receives the user data carried in the transmission.

Figure 29:
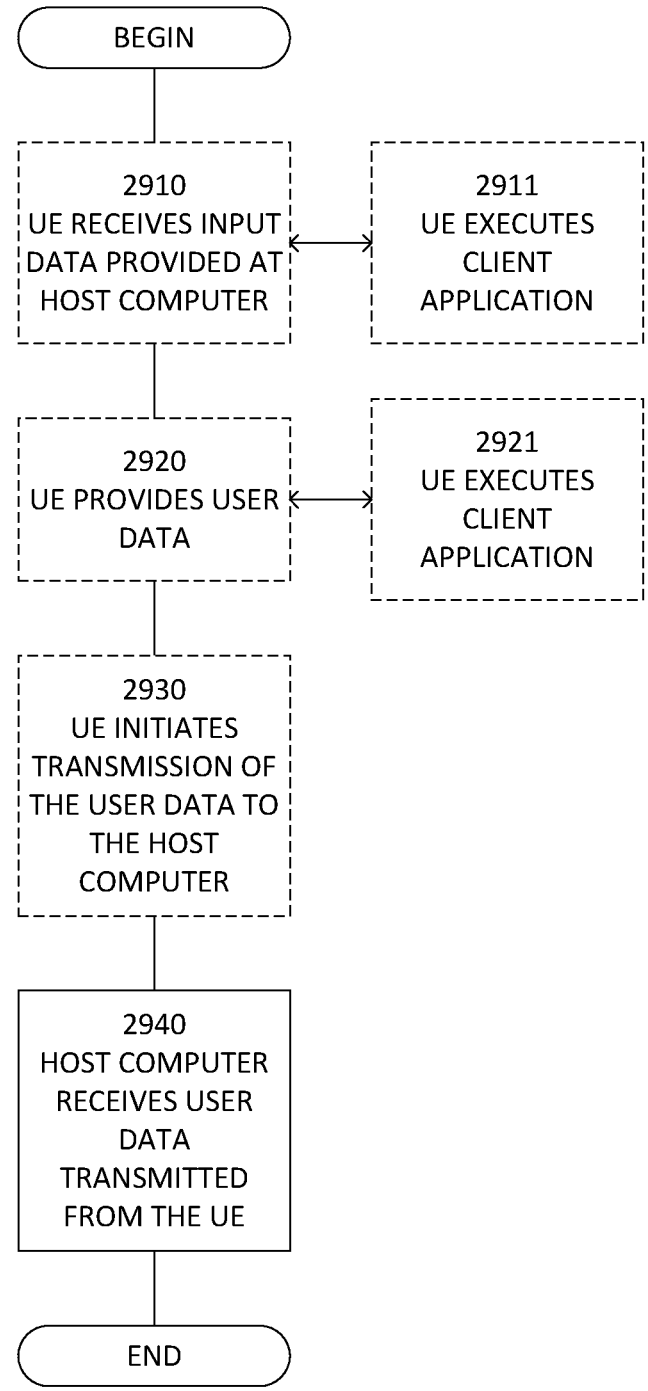
FIG. 29 is a flowchart illustrating a method implemented in a communication system, in accordance with one embodiment.

FIG. 29 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 29 will be included in this section. In step 2910 (which may be optional), the UE receives input data provided by the host computer. Additionally or alternatively, in step 2920, the UE provides user data. In substep 2921 (which may be optional) of step 2920, the UE provides the user data by executing a client application. In substep 2911 (which may be optional) of step 2910, the UE executes a client application which provides the user data in reaction to the received input data provided by the host computer. In providing the user data, the executed client application may further consider user input received from the user. Regardless of the specific manner in which the user data was provided, the UE initiates, in substep 2930 (which may be optional), transmission of the user data to the host computer. In step 2940 of the method, the host computer receives the user data transmitted from the UE, in accordance with the teachings of the embodiments described throughout this disclosure.

Figure 30:
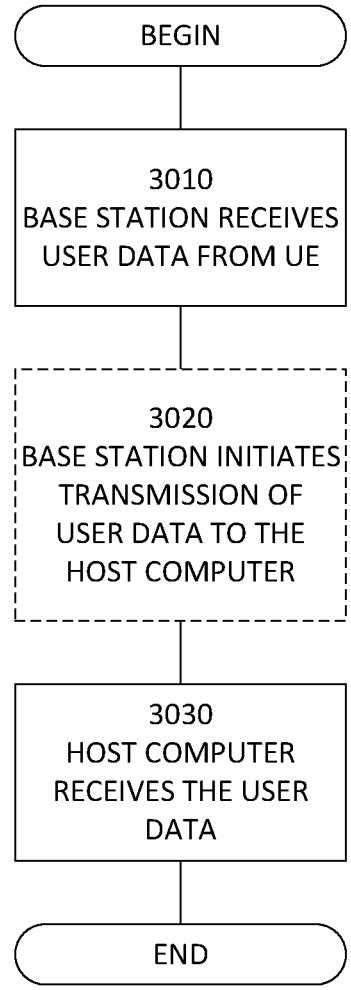
FIG. 30 is a flowchart illustrating a method implemented in a communication system, in accordance with one embodiment.

FIG. 30 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 30 will be included in this section. In step 3010 (which may be optional), in accordance with the teachings of the embodiments described throughout this disclosure, the base station receives user data from the UE. In step 3020 (which may be optional), the base station initiates transmission of the received user data to the host computer. In step 3030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Example embodiments of the techniques and apparatus described herein include, but are not limited to, the following enumerated examples:

GROUP A EMBODIMENTS

A1. A method performed by a wireless device for radio access technology, RAT, dependent positioning, the method comprising:
receiving, from a network node, assistance data that assists the wireless device with RAT-dependent positioning, wherein the assistance data is based on device-specific information that includes one or more of:
a subscription associated with the wireless device;
one or more capabilities of the wireless device;
one or more positioning requirements of the wireless device;
one or more reasons that the wireless device needs the assistance data; or location or path information of the wireless device.

A2. The method of embodiment A1, wherein the assistance data includes cell-specific information for one or more cells.

A3. The method of embodiment A2, wherein, for each of the one or more cells, the cell-specific information includes one or more of:
an identity of the cell;
a location of the cell;
a real-time difference between the cell and each of one or more others of the one or more cells; or
a drift rate between the cell and each of one or more others of the one or more cells.

A4. The method of any of embodiments A2-A3, wherein for which one or more cells the assistance data includes cell-specific information is based on the device-specific information.

A5. The method of any of embodiments A2-A4, wherein the one or more cells for which the assistance data includes cell-specific information comprise one or more cells in or near a path that the wireless device is or is expected to move according to the location or path information of the wireless device.

A6. The method of embodiment A5, further comprising reporting a path that the wireless device is or is expected to move.

A7. The method of any of embodiments A4-A6, wherein:
for which one or more clusters of cells the assistance data includes cell-specific information is based on the device-specific information; and/or
for which one or more zones of cell clusters the assistance data includes cell-specific information is based on the device-specific information.

A8. The method of any of embodiments A2-A7, wherein for how many cells the assistance data includes cell-specific information is based on the device-specific information.

A9. The method of any of embodiments A2-A8, wherein a number of cells for which the assistance data includes cell-specific information increases with increases in one or more of:
a level of the subscription associated with the wireless device;
a positioning quality of service required by the one or more positioning requirements of the wireless device; or
a memory capability and/or processing capability of the wireless device.

A10. The method of any of embodiments A8-A9, wherein:
for how many clusters of cells the assistance data includes cell-specific information is based on the device-specific information;
how many cells are included in one or more clusters of cells for which the assistance data includes cell-specific information is based on the device-specific information;
for how many zones of cell clusters the assistance data includes cell-specific information is based on the device-specific information; and/or
how many cell clusters are included in one or more zones for which the assistance data includes cell-specific information is based on the device-specific information.

A11. The method of any of embodiments A2-A10, wherein which one or more types of cell-specific information the assistance data includes is based on the device-specific information.

A12. The method of any of embodiments A2-A11, wherein whether the cell-specific information includes real-time difference information for each of the one or more cells depends on a level of the subscription associated with the wireless device and/or depends on a positioning quality of service required by the one or more positioning requirements of the wireless device.

A13. The method of any of embodiments A2-A12, wherein the one or more cells for which the assistance data includes cell-specific information include one or more cells that belong to one or more clusters of cells and/or one or more zones of cell clusters.

A14. The method of embodiment A13, wherein the one or more clusters of cells correspond to or are mapped to one or more Radio Network Areas.

A15. The method of any of embodiments A1-A14, further comprising transmitting, from the wireless device to the network node, a request for the assistance data.

A16. The method of any of embodiments A1-A15, wherein the one or more reasons that the wireless device needs the assistance data include:
pedestrian navigation;
low mobility vehicular navigation;
high speed mobility; and/or
verification of positioning obtained from RAT-independent positioning.

A17. The method of any of embodiments A1-A16, further comprising transmitting, from the wireless device to the network node, control signaling that indicates at least some of the device-specific information.

A18. The method of embodiment A17, wherein the control signaling comprises or is included in a mobile originated location request message.

A19. The method of any of embodiments A17-A18, wherein the at least some of the device-specific information indicated by the control signaling includes at least one or more of:
the one or more capabilities of the wireless device;
the one or more positioning requirements of the wireless device;
the one or more reasons that the wireless device needs the assistance data; or
the location or path information of the wireless device.

A20. The method of any of embodiments A1-A19, further comprising receiving validity information from the network node indicating for how long the assistance data will be valid, and wherein the method further comprises requesting updated assistance data responsive to the assistance data becoming invalid.

A21. The method of any of embodiments A1-A20, wherein the network node is a location server.

A22. The method of any of embodiments A1-A21, wherein the network node implements a location management function, LMF.

A23. The method of any of embodiments A1-A20, wherein the network node is configured to perform mobility management.

A24. The method of any of embodiments A1-A20 and A23, wherein the network node implements an access and mobility function, AMF.

A25. The method of any of embodiments A1-A24, wherein the RAT-dependent positioning comprises downlink observed time difference of arrival.

A26. The method of any of embodiments A1-A25, further comprising performing the RAT-dependent positioning based on assistance from the assistance data.

A27. A method performed by a wireless device for radio access technology, RAT, dependent positioning, the method comprising:

transmitting, from the wireless device to a network node, control signaling that indicates device-specific information, wherein the device-specific information includes one or more of:
a subscription associated with the wireless device;
one or more capabilities of the wireless device;
one or more positioning requirements of the wireless device;
one or more reasons that the wireless device needs the assistance data; or
location or path information of the wireless device.

AA1. A method performed by a wireless device for device-based positioning in a wireless communication network, the method comprising:
receiving, from the wireless communication network, assistance data for device-based positioning; and
receiving, from the wireless communication network, configuration signaling that configures the wireless device to, while the wireless device is in an idle mode or an inactive mode, obtain device-based positioning information using the assistance data and store the device-based positioning information at the wireless device at least until the wireless device reports the device-based positioning information in a connected mode.

AA2. A method performed by a wireless device for device-based positioning in a wireless communication network, the method comprising:
receiving, from the wireless communication network, assistance data for device-based positioning; and
receiving, from the wireless communication network, configuration signaling that configures the wireless device to:
obtain device-based positioning information using the assistance data while the wireless device is in an idle mode or an inactive mode; and
report the device-based positioning information in a connected mode when a reporting condition is met.

AA3. The method of any of embodiments AA1-AA2, wherein the idle mode is radio resource control, RRC, idle mode, and wherein the inactive mode is RRC inactive mode.

AA4. The method of any of embodiments AA1-AA3, further comprising, based on the configuration signaling and while the wireless device is in the idle mode or the inactive mode, obtaining the device-based positioning information using the assistance data.

AA5. The method of any of embodiments AA1-AA4, further comprising, based on the configuration signaling and while the wireless device is in the idle mode or the inactive mode, storing the device-based positioning information at the wireless device.

AA6. The method of any of embodiments AA1-AA5, further comprising, based on the configuration signaling, reporting the device-based positioning information in the connected mode.

AA7. The method of any of embodiments AA1-AA6, wherein the device-based positioning information includes one or more of:
positioning measurements performed by the wireless device;
an estimate of a position of the wireless device as determined by the wireless device.

AA8. The method of any of embodiments AA1-AA7, wherein the configuration signaling and/or the assistance data is received from a location server in the wireless communication network.

AA9. The method of any of embodiments AA1-AA8, wherein the configuration signaling indicates one or more events whose occurrence is to trigger the wireless device to store the device-based positioning information while the wireless device is in an idle mode or an inactive mode.

AA10. The method of embodiment AA9, wherein the one or more events include the wireless device switching from being served by a cell belonging to one cluster of cells to being served by a cell belonging to a different cluster of cells.

AA11. The method of embodiment AA9, wherein the one or more events include the wireless device switching from being served by a cell belonging to one radio network area (RNA) to being served by a cell belonging to a different RNA.

AA12. The method of any of embodiments AA1-AA11, wherein the configuration signaling indicates one or more events whose occurrence is to trigger the wireless device to obtain the device-based positioning information while the wireless device is in an idle mode or an inactive mode.

AA13. The method of embodiment AA12, wherein occurrence of the one or more events triggers the wireless device to perform a positioning measurement.

AA14. The method of any of embodiments AA12-AA13, wherein the one or more events include fluctuation of a parameter by at least a defined fluctuation threshold.

AA15. The method of embodiment AA14, wherein the parameter includes geometric dilution of precision or reference signal received power.

AA16. The method of any of embodiments AA1-AA15, wherein the configuration signaling indicates a response time whose expiry is to trigger the wireless device to report the device-based positioning information.

AA17. The method of embodiment AA6, wherein reporting the device-based positioning information comprises transmitting a report that includes one or more of:
  timestamps associated with a positioning measurement;
  a list of one or more cells in which the wireless device performing a positioning measurement; or
  one or more positioning measurements associated with a respective timestamp.

AA18. The method of embodiment AA6, wherein reporting the device-based positioning information comprises reporting the device-based positioning information responsive to one or more of:
  expiry of a response time indicated by the configuration signaling;
  termination of a positioning session;
  a need for the wireless communication network to verify a positioning estimate determined by the wireless device.

AA19. The method of embodiment AA6, wherein reporting the device-based positioning information comprises reporting the device-based positioning information responsive to a request received from the wireless communication network for the device-based positioning information.

AA20. The method of any of embodiments AA1-AA20, wherein the configuration signaling configures the wireless device to include the device-based positioning information in a logged minimization of drive test.

AA. The method of any of the previous embodiments, further comprising:
  providing user data; and
  forwarding the user data to a host computer via the transmission to a base station.

GROUP B EMBODIMENTS

B1. A method performed by a network node for assisting with radio access technology, RAT, dependent positioning, the method comprising:
  transmitting, to a wireless device, assistance data that assists the wireless device with RAT-dependent positioning, wherein the assistance data is based on device-specific information that includes one or more of:
    a subscription associated with the wireless device;
    one or more capabilities of the wireless device;
    one or more positioning requirements of the wireless device;
    one or more reasons that the wireless device needs the assistance data; or location or path information of the wireless device.

B2. The method of embodiment B1, wherein the assistance data includes cell-specific information for one or more cells.

B3. The method of embodiment B2, wherein, for each of the one or more cells, the cell-specific information includes one or more of:
  an identity of the cell;
  a location of the cell;
  a real-time difference between the cell and each of one or more others of the one or more cells; or
  a drift rate between the cell and each of one or more others of the one or more cells.

B4. The method of any of embodiments B2-B3, wherein for which one or more cells the assistance data includes cell-specific information is based on the device-specific information.

B5. The method of any of embodiments B2-B4, wherein the one or more cells for which the assistance data includes cell-specific information comprise one or more cells in or near a path that the wireless device is or is expected to move according to the location or path information of the wireless device.

B6. The method of embodiment B5, wherein the path that the wireless device is or is expected to move is determined based on one or more of:
  a reported path that the wireless device reports as being a path of the wireless device;
  a learned path that machine learning predicts as being a path of the wireless device; or
  a previously traveled path that the wireless device has traveled in the past.

B7. The method of any of embodiments B4-B6, wherein:
  for which one or more clusters of cells the assistance data includes cell-specific information is based on the device-specific information; and/or
  for which one or more zones of cell clusters the assistance data includes cell-specific information is based on the device-specific information.

B8. The method of any of embodiments B2-B7, wherein for how many cells the assistance data includes cell-specific information is based on the device-specific information.

B9. The method of any of embodiments B2-B8, wherein a number of cells for which the assistance data includes cell-specific information increases with increases in one or more of:
  a level of the subscription associated with the wireless device;
  a positioning quality of service required by the one or more positioning requirements of the wireless device; or a memory capability and/or processing capability of the wireless device.

B10. The method of any of embodiments B8-B9, wherein:
for how many clusters of cells the assistance data includes cell-specific information is based on the device-specific information;
how many cells are included in one or more clusters of cells for which the assistance data includes cell-specific information is based on the device-specific information;
for how many zones of cell clusters the assistance data includes cell-specific information is based on the device-specific information; and/or
how many cell clusters are included in one or more zones for which the assistance data includes cell-specific information is based on the device-specific information.

B11. The method of any of embodiments B2-B10, wherein which one or more types of cell-specific information the assistance data includes is based on the device-specific information.

B12. The method of any of embodiments B2-B11, wherein whether the cell-specific information includes real-time difference information for each of the one or more cells depends on a level of the subscription associated with the wireless device and/or depends on a positioning quality of service required by the one or more positioning requirements of the wireless device.

B13. The method of any of embodiments B2-B12, wherein the one or more cells for which the assistance data includes cell-specific information include one or more cells that belong to one or more clusters of cells and/or one or more zones of cell clusters.

B14. The method of embodiment B13, wherein the one or more clusters of cells correspond to or are mapped to one or more Radio Network Areas.

B15. The method of any of embodiments B1-B14, further comprising determining the assistance data based on the device-specific information.

B16. The method of embodiment B15, wherein said determining comprises determining, based on the device-specific information, one or more of:
for which one or more cells, one or more clusters of cells, and/or one or more zones of cell clusters the assistance data is to include cell-specific information;
for how many cells, clusters of cells, and/or zones of cell clusters the assistance data is to include cell-specific information; or
which one or more types of cell-specific information the assistance data is to include for each of one or more cells, one or more clusters of cells, or one or more zones of cell clusters.

B17. The method of any of embodiments B1-B16, wherein the one or more reasons that the wireless device needs the assistance data include:
pedestrian navigation;
low mobility vehicular navigation;
high speed mobility; and/or
verification of positioning obtained from RAT-independent positioning.

B18. The method of any of embodiments B1-B17, further comprising receiving, from the wireless device, control signaling that indicates at least some of the device-specific information.

B19. The method of embodiment B18, wherein the control signaling comprises or is included in a mobile originated location request message.

B20. The method of any of embodiments B18-B19, wherein the at least some of the device-specific information indicated by the control signaling includes at least one or more of:
the one or more capabilities of the wireless device;
the one or more positioning requirements of the wireless device;
the one or more reasons that the wireless device needs the assistance data; or
the location or path information of the wireless device.

B21. The method of any of embodiments B1-B20, further comprising transmitting validity information to the wireless device indicating for how long the assistance data will be valid.

B22. The method of any of embodiments B1-B21, wherein the network node is a location server.

B23. The method of any of embodiments B1-B22, wherein the network node implements a location management function, LMF.

B24. The method of any of embodiments B1-B21, wherein the network node is configured to perform mobility management.

B25. The method of any of embodiments B1-B21 and B24, wherein the network node implements an access and mobility function, AMF.

B26. The method of any of embodiments B1-B25, wherein the RAT-dependent positioning comprises downlink observed time difference of arrival.

BB1. A method performed by a network node in a wireless communication network for configuring device-based positioning, the method comprising:
transmitting, to a wireless device, assistance data for device-based positioning; and
transmitting, to the wireless device, configuration signaling that configures the wireless device to, while the wireless device is in an idle mode or an inactive mode, obtain device-based positioning information using the assistance data and store the device-based positioning information at the wireless device at least until the wireless device reports the device-based positioning information in a connected mode.

BB2. A method performed by a network node in a wireless communication network for configuring device-based positioning, the method comprising:
transmitting, to a wireless device, assistance data for device-based positioning; and
transmitting, to the wireless device, configuration signaling that configures the wireless device to:
obtain device-based positioning information using the assistance data while the wireless device is in an idle mode or an inactive mode; and
report the device-based positioning information in a connected mode when a reporting condition is met.

BB3. The method of any of embodiments BB1-BB2, wherein the idle mode is radio resource control, RRC, idle mode, and wherein the inactive mode is RRC inactive mode.

BB4. The method of any of embodiments BB1-BB5, further comprising, in accordance with the configuration signaling, receiving a report of the device-based positioning information while the wireless device is in the connected mode.

BB5. The method of any of embodiments BB1-BB4, further comprising verifying a position of the wireless device based on the device-based positioning information as reported to the network node while the wireless device is in the connected mode.

BB6. The method of any of embodiments BB1-BB5, wherein the device-based positioning information includes one or more of:
  positioning measurements performed by the wireless device;
  an estimate of a position of the wireless device as determined by the wireless device.

BB7. The method of any of embodiments BB1-BB6, wherein the network node a location server in the wireless communication network.

BB8. The method of any of embodiments BB1-BB7, wherein the configuration signaling indicates one or more events whose occurrence is to trigger the wireless device to store the device-based positioning information while the wireless device is in an idle mode or an inactive mode.

BB9. The method of embodiment BB8, wherein the one or more events include the wireless device switching from being served by a cell belonging to one cluster of cells to being served by a cell belonging to a different cluster of cells.

BB10. The method of embodiment BB8, wherein the one or more events include the wireless device switching from being served by a cell belonging to one radio network area (RNA) to being served by a cell belonging to a different RNA.

BB11. The method of any of embodiments BB1-BB10, wherein the configuration signaling indicates one or more events whose occurrence is to trigger the wireless device to obtain the device-based positioning information while the wireless device is in an idle mode or an inactive mode.

BB12. The method of embodiment BB11, wherein occurrence of the one or more events triggers the wireless device to perform a positioning measurement.

BB13. The method of any of embodiments BB11-BB12, wherein the one or more events include fluctuation of a parameter by at least a defined fluctuation threshold.

BB14. The method of embodiment BB13, wherein the parameter includes geometric dilution of precision or reference signal received power.

BB15. The method of any of embodiments BB1-BB14, wherein the configuration signaling indicates a response time whose expiry is to trigger the wireless device to report the device-based positioning information.

BB16. The method of embodiment BB4, wherein the report includes one or more of:
  timestamps associated with a positioning measurement;
  a list of one or more cells in which the wireless device performing a positioning measurement; or
  one or more positioning measurements associated with a respective timestamp.

BB17. The method of embodiment BB4, wherein the report is received responsive to one or more of:
  expiry of a response time indicated by the configuration signaling;
  termination of a positioning session;
  a need for the wireless communication network to verify a positioning estimate determined by the wireless device.

BB18. The method of embodiment BB4, further comprising transmitting a request to the wireless device requesting a report of the device-based positioning information as stored while the wireless device was in an idle mode or an inactive mode, and wherein the report is received responsive to the request.

BB19. The method of any of embodiments BB1-BB19, wherein the configuration signaling configures the wireless device to include the device-based positioning information in a logged minimization of drive test.

BB. The method of any of the previous embodiments, further comprising:
  obtaining user data; and
  forwarding the user data to a host computer or a wireless device.

GROUP C EMBODIMENTS

C1. A wireless device configured to perform any of the steps of any of the Group A embodiments.

C2. A wireless device comprising processing circuitry configured to perform any of the steps of any of the Group A embodiments.

C3. A wireless device comprising:
  communication circuitry; and
  processing circuitry configured to perform any of the steps of any of the Group A embodiments.

C4. A wireless device comprising:
  processing circuitry configured to perform any of the steps of any of the Group A embodiments; and
  power supply circuitry configured to supply power to the wireless device.

C5. A wireless device comprising:
  processing circuitry and memory, the memory containing instructions executable by the processing circuitry whereby the wireless device is configured to perform any of the steps of any of the Group A embodiments.

C6. A user equipment (UE) comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;
  an input interface connected to the processing circuitry and configured to allow input of information into the UE to be processed by the processing circuitry;
  an output interface connected to the processing circuitry and configured to output information from the UE that has been processed by the processing circuitry; and
  a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A network node configured to perform any of the steps of any of the Group B embodiments.

C10. A network node comprising processing circuitry configured to perform any of the steps of any of the Group B embodiments.

C11. A network node comprising:
  communication circuitry; and
  processing circuitry configured to perform any of the steps of any of the Group B embodiments.

C12. A network node comprising:
  processing circuitry configured to perform any of the steps of any of the Group B embodiments;

power supply circuitry configured to supply power to the network node.

C13. A network node comprising:
processing circuitry and memory, the memory containing instructions executable by the processing circuitry whereby the network node is configured to perform any of the steps of any of the Group B embodiments.

C14. The network node of any of embodiments C9-C13, wherein the network node is a location server or is configured to perform mobility management.

C15. A computer program comprising instructions which, when executed by at least one processor of a network node, causes the radio network node to carry out the steps of any of the Group B embodiments.

C16. The computer program of embodiment C14, wherein the network node is a location server or is configured to perform mobility management.

C17. A carrier containing the computer program of any of embodiments C15-C16, wherein the carrier is one of an electronic signal, optical signal, radio signal, or computer readable storage medium.

GROUP D EMBODIMENTS

D1-D8. Reserved.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
the processing circuitry of the host computer is configured to execute a host application; and
the UE's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
at the UE, executing a client application, thereby providing the user data to be transmitted; and
at the host computer, executing a host application associated with the client application.

D22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

D23-D26. Reserved.

D27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:
1. A method performed by a wireless device for radio access technology (RAT) dependent device-based positioning in a wireless communication network, the method comprising:

receiving, from a network node, assistance data that assists the wireless device with RAT-dependent device-based positioning, wherein the assistance data is based on device-specific information that includes a level of a subscription of the wireless device, wherein, based on the level of the subscription of the wireless device being higher than a threshold level, the assistance data includes cell-specific information for one or more cells, clusters of cells, or zones of clusters, wherein, for each of the one or more cells, clusters of cells, or zones of clusters, the cell-specific information includes a real-time difference between the cell, cluster of cells, or zone of clusters and each of one or more others of the one or more cells, clusters of cells, or zones of clusters; and performing the RAT-dependent device-based positioning based on assistance from the assistance data, wherein performing the RAT-dependent device-based positioning comprises the wireless device calculating its own position based on the assistance data.

2. The method of claim 1, wherein the assistance data includes cell-specific information for one or more cells, wherein, for each of the one or more cells, the cell-specific information includes at least one of any one or more of:
an identity of the cell;
a location of the cell;
a real-time difference between the cell and each of one or more others of the one or more cells; and
a drift rate between the cell and each of one or more others of the one or more cells.

3. The method of claim 2, wherein for which one or more cells, clusters of cells, or zones of clusters the assistance data includes cell-specific information is based on the device-specific information.

4. The method of claim 2, wherein the device-specific information also includes location or path information of the wireless device, and wherein the one or more cells, clusters of cells, or zones of clusters for which the assistance data includes cell-specific information comprise one or more cells, clusters of cells, or zones of clusters in or near a path that the wireless device is or is expected to move according to the location or path information of the wireless device.

5. The method of claim 2, wherein for how many cells, clusters of cells, or zones of clusters the assistance data includes cell-specific information is based on the device-specific information.

6. The method of claim 2, wherein a number of cells, clusters of cells, or zones of clusters for which the assistance data includes cell-specific information increases with increases in the level of the subscription of the wireless device.

7. The method of claim 2, wherein a number of cells, clusters of cells, or zones of clusters for which the assistance data includes cell-specific information increases with increases in at least one of any one or more of:
a positioning quality of service required by one or more positioning requirements of the wireless device; and
a memory capability and/or processing capability of the wireless device.

8. The method of claim 2, wherein which one or more types of cell-specific information the assistance data includes is based on the device-specific information.

9. The method of claim 2, wherein whether the cell-specific information includes real-time difference information for each of the one or more cells depends on the level of the subscription of the wireless device.

10. The method of claim 9, wherein whether the cell-specific information includes real-time difference information for each of the one or more cells also depends on a positioning quality of service required by one or more positioning requirements of the wireless device, wherein the device-specific information also includes the one or more positioning requirements of the wireless device.

11. The method of claim 1, wherein the device-specific information also includes at least one of any one or more of:
one or more capabilities of the wireless device;
one or more positioning requirements of the wireless device;
one or more reasons that the wireless device needs the assistance data; and
location or path information of the wireless device.

12. The method of claim 11, further comprising transmitting, from the wireless device to the network node, control signaling that indicates at least one of any one or more of:
the one or more capabilities of the wireless device;
the one or more positioning requirements of the wireless device;
the one or more reasons that the wireless device needs the assistance data; or
the location or path information of the wireless device.

13. A method performed by a network node for assisting with radio access technology (RAT) dependent device-based positioning, the method comprising:
transmitting, to a wireless device, assistance data that assists the wireless device with RAT-dependent device-based positioning, wherein the assistance data is based on device-specific information that includes a level of a subscription of the wireless device, wherein, based on the level of the subscription of the wireless device being higher than a threshold level, the assistance data includes cell-specific information for one or more cells, clusters of cells, or zones of clusters, wherein, for each of the one or more cells, clusters of cells, or zones of clusters, the cell-specific information includes a real-time difference between the cell, cluster of cells, or zone of clusters and each of one or more others of the one or more cells, clusters of cells, or zones of clusters, wherein RAT-dependent device-based positioning comprises RAT-dependent positioning in which the wireless device calculates its own position based on the assistance data.

14. The method of claim 13, wherein the assistance data includes cell-specific information for one or more cells, wherein, for each of the one or more cells, the cell-specific information includes at least one of any one or more of:
an identity of the cell;
a location of the cell;
a real-time difference between the cell and each of one or more others of the one or more cells; and
a drift rate between the cell and each of one or more others of the one or more cells.

15. The method of claim 14, wherein for which one or more cells, clusters of cells, or zones of clusters the assistance data includes cell-specific information is based on the device-specific information.

16. The method of claim 14, wherein the device-specific information also includes location or path information of the wireless device, and wherein the one or more cells, clusters of cells, or zones of clusters for which the assistance data includes cell-specific information comprise one or more cells, clusters of cells, or zones of clusters in or near a path that the wireless device is or is expected to move according to the location or path information of the wireless device.

17. The method of claim 14, wherein for how many cells, clusters of cells, or zones of clusters the assistance data includes cell-specific information is based on the device-specific information.

18. The method of claim 14, wherein a number of cells for which the assistance data includes cell-specific information increases with increases in the level of the subscription of the wireless device.

19. The method of claim 14, wherein a number of cells for which the assistance data includes cell-specific information increases with increases in at least one of any one or more of:
- a positioning quality of service required by one or more positioning requirements of the wireless device; or
- a memory capability and/or processing capability of the wireless device.

20. The method of claim 14, wherein which one or more types of cell-specific information the assistance data includes is based on the device-specific information.

21. The method of claim 14, wherein whether the cell-specific information includes real-time difference information for each of the one or more cells depends on the level of the subscription of the wireless device and/or depends on a positioning quality of service required by one or more positioning requirements of the wireless device, wherein the device-specific information also includes the one or more positioning requirements of the wireless device.

22. The method of claim 13, further comprising determining the assistance data based on the device-specific information.

23. A wireless device configured for radio access technology (RAT) dependent device-based positioning in a wireless communication network, the wireless device comprising:
communication circuitry; and
processing circuitry configured to:
receive, from a network node, assistance data that assists the wireless device with RAT-dependent device-based positioning, wherein the assistance data is based on device-specific information that includes a level of a subscription of the wireless device, wherein, based on the level of the subscription of the wireless device being higher than a threshold level, the assistance data includes cell-specific information for one or more cells, clusters of cells, or zones of clusters, wherein, for each of the one or more cells, clusters of cells, or zones of clusters, the cell-specific information includes a real-time difference between the cell, cluster of cells, or zone of clusters and each of one or more others of the one or more cells, clusters of cells, or zones of clusters; and
perform the RAT-dependent device-based positioning based on assistance from the assistance data, including calculating a position of the wireless device based on the assistance data.

24. The wireless device of claim 23, wherein the assistance data includes cell-specific information for one or more cells, wherein, for each of the one or more cells, the cell-specific information includes at least one of any one or more of:
an identity of the cell;
a location of the cell;
a real-time difference between the cell and each of one or more others of the one or more cells; and
a drift rate between the cell and each of one or more others of the one or more cells.

25. A network node configured for assisting with radio access technology (RAT) dependent device-based positioning, the network node comprising:
communication circuitry; and
processing circuitry configured to transmit, to a wireless device, assistance data that assists the wireless device with RAT-dependent device-based positioning, wherein the assistance data is based on device-specific information that includes a level of a subscription of the wireless device, wherein, based on the level of the subscription of the wireless device being higher than a threshold level, the assistance data includes cell-specific information for one or more cells, clusters of cells, or zones of clusters, wherein, for each of the one or more cells, clusters of cells, or zones of clusters, the cell-specific information includes a real-time difference between the cell, cluster of cells, or zone of clusters and each of one or more others of the one or more cells, clusters of cells, or zones of clusters, wherein RAT-dependent device-based positioning comprises RAT-dependent positioning in which the wireless device calculates its own position.

26. The network node of claim 25, wherein the assistance data includes cell-specific information for one or more cells, wherein, for each of the one or more cells, the cell-specific information includes at least one of any one or more of:
an identity of the cell;
a location of the cell;
a real-time difference between the cell and each of one or more others of the one or more cells; and
a drift rate between the cell and each of one or more others of the one or more cells.

\* \* \* \* \*